United States Patent
Boyd et al.

(10) Patent No.: US 7,072,848 B2
(45) Date of Patent: Jul. 4, 2006

(54) PROMOTION PRICING SYSTEM AND METHOD

(75) Inventors: Dean Weldon Boyd, Cottage Grove, OR (US); Prashandt Narayan Balepur, San Jose, CA (US); Henry Frederick Schwarz, Foster City, CA (US); Philip David Reginald Apps, San Francisco, CA (US); Ravishankar Venkata Nandiwada, San Jose, CA (US); Brian Lawrence Monteiro, Sunnyvale, CA (US); Thomas Edward Guardino, Eugene, OR (US)

(73) Assignee: Manugistics, Inc., Rockville, MD (US)

( * ) Notice: Subject to any disclaimer, the term of this patent is extended or adjusted under 35 U.S.C. 154(b) by 756 days.

(21) Appl. No.: 09/987,706

(22) Filed: Nov. 15, 2001

(65) Prior Publication Data

US 2002/0123930 A1    Sep. 5, 2002

Related U.S. Application Data

(60) Provisional application No. 60/249,057, filed on Nov. 15, 2000.

(51) Int. Cl.
*G06F 17/60* (2006.01)

(52) U.S. Cl. .......................................... 705/10; 705/14
(58) Field of Classification Search ................ 705/10, 705/14

See application file for complete search history.

(56) References Cited

U.S. PATENT DOCUMENTS

| | | | | |
|---|---|---|---|---|
| 5,953,707 A * | 9/1999 | Huang et al. | ................. | 705/10 |
| 6,029,139 A | 2/2000 | Cunningham et al. | ........ | 705/10 |
| 6,044,357 A | 3/2000 | Garg | ............................ | 705/10 |
| 6,061,691 A | 5/2000 | Fox | .......................... | 707/104.1 |
| 6,078,893 A * | 6/2000 | Ouimet et al. | ................. | 705/10 |
| 6,085,164 A | 7/2000 | Smith et al. | .................... | 705/5 |
| 6,094,641 A | 7/2000 | Ouimet et al. | ................. | 705/10 |
| 6,223,163 B1 | 4/2001 | Van Luchene | ................. | 705/1 |
| 6,286,005 B1 * | 9/2001 | Cannon | ...................... | 707/100 |
| 6,839,682 B1 * | 1/2005 | Blume et al. | ................. | 705/10 |
| 2001/0027455 A1 * | 10/2001 | Abulleil et al. | ............. | 707/102 |
| 2002/0169657 A1 * | 11/2002 | Singh et al. | .................. | 705/10 |
| 2003/0195806 A1 * | 10/2003 | Willman et al. | .............. | 705/14 |
| 2004/0122731 A1 * | 6/2004 | Mannik et al. | ............... | 705/14 |

OTHER PUBLICATIONS

Anon., "Siemens Nixdorf: Siemens Nixdorf Extends Enterprise Solns Portfolio with Launch of Retail Data Warehouse," M2 Presswire, Jun. 25, 1999.*

(Continued)

*Primary Examiner*—Nicholas D. Rosen
(74) *Attorney, Agent, or Firm*—Hogan & Hartson LLP

(57) ABSTRACT

A promotion pricing system produces an evaluation so as to analyze, evaluate, improve, and design promotions. The promotion pricing system generates promotion price evaluations and recommendations for each promotion related to a target product, along with analyzing competing products from the same seller and its competitors. The computerized promotion pricing system includes modules for carrying out necessary analytical steps, where the modules cooperate to implement a statistical market response estimation that provide statistically stable information on customer response to promotions using either an attractive or a multiplicative model, where the model is selected dynamically. The modules include a product segmentation module, an incentive translation module, a customer segmentation module, a data aggregation module, a model selection module, a calibration module, an evaluation module, a constraints generation module, a cost structure module, an optimization module, a market channel performance module, and an alert module.

18 Claims, 16 Drawing Sheets

OTHER PUBLICATIONS

Naert, P., et al., "On the Prediction Power of Market Share Attraction Models" (Abstract only), Journal of Marketing Research, vol. 18, No. 2, pp. 146-153, May 1981.*

Brodie et al., "Attraction Versus Linear and Multiplicative Market Share Models: An Empirical Evaluation" (Abstract only), Journ of Marketing Research, vol. 21, No. 2, pp. 194-201, May 1984).*

Blattberg, R.C. et al., "Modelling the Effectiveness and Profitability of Trade Promotions" (Abstract only), Marketing Science, Vo 6, No. 2, pp. 124-126, Spring 1987.*

Simester, D., "Optimal Promotion Strategies: A Demand-Sided Characterization" (Abstract only), Management Science, vol. 43, No. 2, pp. 251-256, Feb. 1997.*

InternationalSearch Report (U.S. Search Authority), PCT/US01/43100, dated Mar. 25, 2002.

Friedman, D.D., "Price Theory: An Intermediate Text," 2$^{nd}$ Edition, South-Western Publishing Co., 1990, Chapter 10, Part 2, pp. 255-263.

Mohn, N.C., "Pricing Research For Decision Making," Marketing Research, Winter 1995, vol. 7, No. 1, pp. 10-19.

Garry, M., "Computing Promotions," Progressive Grocer, Jul. 1995, vol. 74, No. 7, p. 95.

Anon, "Hyperion and Informatica Help Customers Extend the Value of Data In ERP Systems and Data Warehouses," Business Wire, Apr. 27, 1999.

* cited by examiner

PROMOTION PRICING SYSTEM AND METHOD

RELATED APPLICATIONS

This application claims priority from U.S. Provisional Application No. 60/249,057 filed Nov. 15, 2000, the disclosure of which is hereby incorporated by reference in its entirety.

FIELD OF THE INVENTION

The present invention relates to a system and method for assessing a proposed promotion scheme. In particular, the present invention pertains to a system and method for assessing the promotion scheme in view of desired business goals such as increasing sales of particular products to a particular group of consumers, as well as suggesting improved promotion schemes to better achieve these business goals.

BACKGROUND OF THE INVENTION

Businesses commonly use promotional schemes to improve sales volumes and profits. For instance, a business may adjust prices as needed to encourage sales of particular products. Likewise, businesses may specially present or advertise their products to increase consumer awareness and demand. To generate incremental revenue or expand market share, companies spend billions of dollars annually in promotional discounts, rebates, cash incentives, coupons, and subsidized financing. Because of the variety of promotions in play at any one time, the complexity of the market, and an inadequate understanding of customer response, few companies are able to accurately predict the overall effectiveness of their promotional spending.

The user making promotion decisions is faced with the challenge of how to best target promotional spending to achieve corporate goals at the lowest cost. To make this decision, the user needs to accurately forecast how a proposed promotion will affect revenues, profits, and sales volumes for each product. Likewise, the user needs to calculate how much each promotion will reduce on-hand inventory while minimizing cross-product and cross-segment dilution. The user further needs to predict how different market segments will react to different types of promotions. The user also needs to determine which combination of promotions will produce the highest return on expenditure while meeting sales, margin, and market share targets.

It is therefore a goal of the present invention to provide a system and method of accurately forecasting the impact of promotions and to automate these tasks. It is a further goal of the present invention to provide a system and method to automatically determine the best allocation of promotional expenditure.

SUMMARY OF THE PRESENT INVENTION

In response to these and other needs, the present invention provides a promotion pricing system and a related model for producing a value evaluation and recommendation for promotion on a targeted product so as to analyze, evaluate, improve, and design promotions to meet a user's need. The promotion pricing system generates promotion price evaluations and recommendations for each product promotion related to a target product of a user along with associated competing products from the user and competitors. The user can be an individual, an organization, a corporation, an association or any entity providing, including activities related to making, selling, resale, offering for sale, distributing and other commercial conducts, products or service or both in the stream of commerce.

The promotion pricing system of the present invention is general enough to provide price evaluations and recommendations with varying degrees of available data. While the ideal client for the system would maintain data on lost customers, competitor prices, industry availability and the like, most clients will have data on only a subset of the potential drivers of market response. In this way, the system enables the user to obtain valuable insight from the evaluation of a promotion program even with a minimum amount of input data and then increasing that value through increased forecasting accuracy and accurate evaluation as new and/or existing data is integrated.

The promotion pricing system of the present invention enables the user to determine the impact of proposed promotions before committing to the promotion. Using historical data and statistically derived market response models, the promotion pricing system tests promotional scenarios and forecasts the results. The user can then determine how much each proposed promotion will affect revenues, profits, and sales volumes; how much each promotion will reduce on-hand inventory, how different customer segments will respond to different promotions, and which combination of promotions will generate the highest return on your promotional expenditures. In one embodiment, the promotion pricing system can simultaneously consider cannibalization effects of the promotion on other products or channels, allowing the user to maximize overall revenue growth.

With the promotion system of the present invention, the user may develop and target promotions for each product, customer segment, and distribution channel. The promotion system further helps the user determine the best allocation of promotion and incentive dollars to meet your goals at the lowest possible expenditure. In this way, the promotion system and method of the present invention can produce substantial additional profit per year.

Also, once the promotional campaign is under way, the promotion system of the present invention tracks its progress, generates performance alerts when user-defined parameters are exceeded, and quickly pinpoints problems. Meanwhile, results are fed back into the system to help fine-tune future campaigns.

Overall, the promotion system of the present invention allows a business to better understand customer price sensitivity and to acquire new customers at the least cost while retaining existing customers. The system further helps manage product or service life cycles by suggesting promotions to encourage the sale of older inventory. The promotion system further acts to minimize product cannibalization and to address sales shortfalls.

In the preferred embodiment, the promotion pricing system of the presenting invention is comprised of modularization of the necessary analytical steps along with specifications for these modules. These modules cooperate to implement statistical market response estimation that provides statistically stable, fact-based information on customer response to promotions. The modules further allow data capture to leverage enterprise and supply chain data sources. The modules include a product segmentation module, an incentive translation module, a customer segmentation module, a data aggregation module, a model selection module, a calibration module, an evaluation module, a constraints generation module, a cost structure module, an optimization module, a market channel performance module, and an alert module.

In another embodiment, the system has a distributed architecture that is flexible, easy to configure, and easy to deploy and use over an internet/intranet. Specifically, a preferred embodiment of the promotion pricing system is constructed using modules coded in Java and distributed over the Internet to allow large-scale, controlled access to the promotion pricing system of the present invention.

In another embodiment, the system may include a promotion pricing dashboard to enable proactive analysis of business performance and market dynamics. The system may also include a strategy tester to help determine the most effective promotion schemes as well as a market response engine to maximize demand lift, revenue, and profits.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE PREFERRED EMBODIMENTS

Figure 1A:
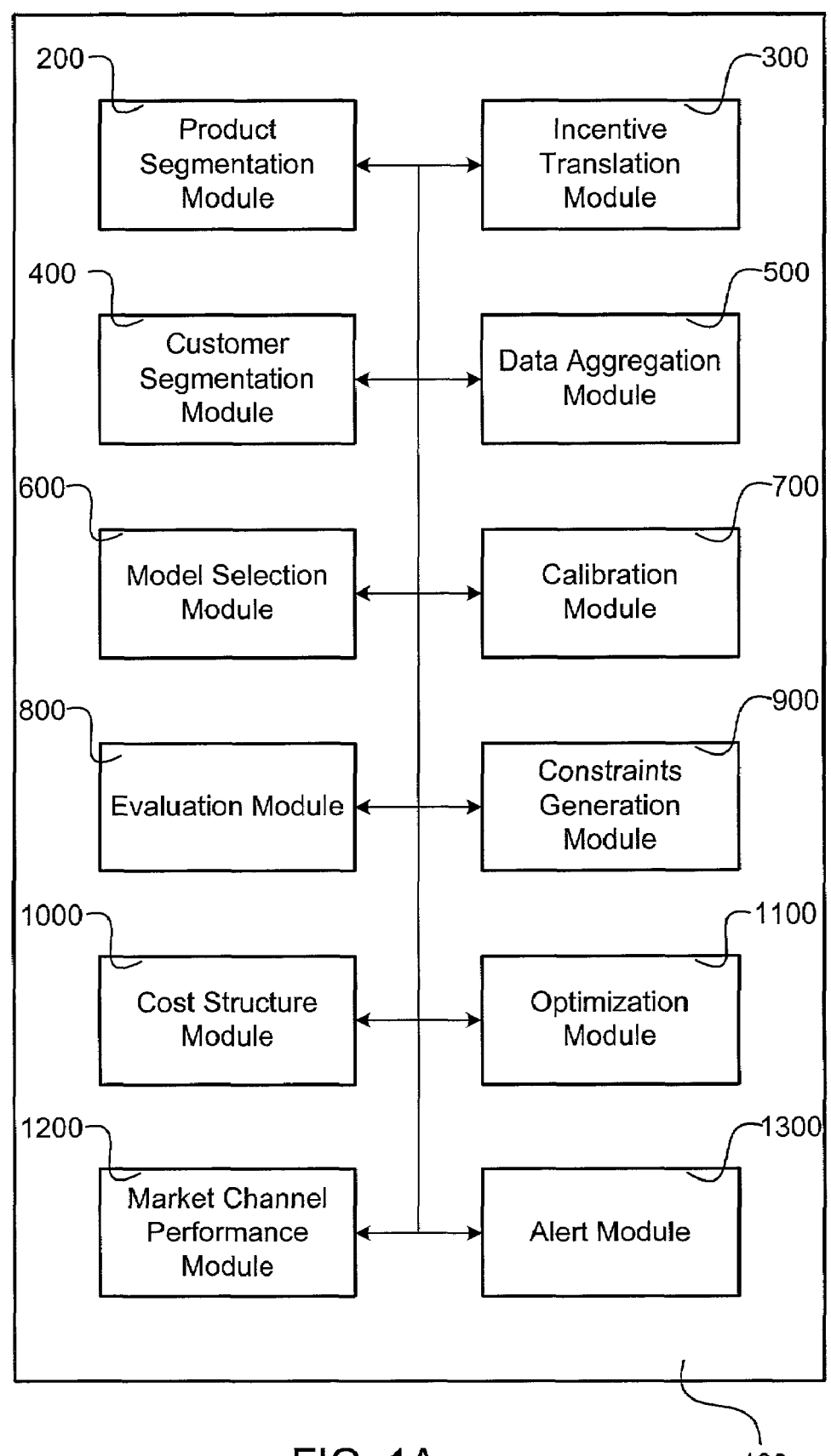
FIGS. 1A–C illustrate block diagrams of a promotion pricing system in accordance with embodiments of the present invention.

As generally illustrated in FIG. 1A, the present invention provides a promotion pricing system 100 for producing and evaluating promotion pricing strategies. In particular, a user may employ the present invention to evaluate historical data to determine a more ideal promotional strategy to accomplish various business goals, such as increasing total sales volumes or increasing sales in certain desired market segments. The promotion pricing system functions to either propose a promotional strategy or to evaluate the expected effect of a promotional policy provided by the user. The promotion pricing system 100 works by defining the market by specifying the various products in the market, as well as the suppliers (i.e., sellers in the market) and demanders (i.e., consumers). The promotion pricing system 100 then looks to historical market data to create a market model which may be used to determine various information, such as profit or sales maximizing conditions.

In various implementations of the preferred embodiment, the promotion pricing system 100 includes combinations of the following components: A product segmentation module ("PSM") 200, an incentive translation module ("ITM") 300, a customer segmentation module ("CUSM") 400 a data aggregation module ("DAM") 500, a model selection module ("MSM") 600, a calibration module ("CM") 700, an evaluation module ("EM") 800, a constraints generation module ("CGM") 900, a cost structure module ("COSM") 1000, an optimization module ("OM") 1100, a market channel performance module ("MCPM") 1200, and an alert module ("AM") 1300. Each of these modules 200–1300 may generally function as software applications that coexist on a single computer. Alternatively, the components may operate concurrently on independent computers, while interacting and exchanging data using known communication and networking techniques. The modules 200–1300, as well as the general operation of the promotion pricing system 100, are now described in greater detail below. However, the general overall operation of the promotion pricing system 100 is first provided.

Data Inputs and Outputs

As illustrated in FIG. 1A, The promotion pricing system 100 receives various data inputs and processes these inputs to analyze promotion schemes. Among the inputs received by various embodiments of the promotion pricing system 100 are product information, consumer account information, commercial channel information, purchase/sales order information, competitor and competitor product information, and promotion/campaign information.

Product information is part of the base data required by the promotion pricing system 100. The product information consists of basic product information on pricing, costs, inventory and product hierarchies. Likewise, account information provides account or customer profile information. This data is used to micro-segment the market and target different customer profiles with customized promotions. Channel information encompasses data on both inbound Sales channels (via which customers purchase goods or services) and outbound Marketing channels (through which customers are presented with promotional campaigns). The promotion pricing system 100 uses this information to incorporate sales channel-specific buying behavior, price elasticity, and costs. Information on outbound channels is used to model marketing channel-specific cost distinctions and response variations. Overall, product, account, and channel information form the base data for the promotion pricing system 100.

Purchase, or sales order, data drives the analysis of the promotion pricing system. Sales order information answers the question "who bought what at what price when and how," where the "who" identifies the customer segment or profile of the customer; the "what" the set of products or services on offer; the "price" the pricing information associated with the sale, including any promotion information if relevant, and the "when" the timing of the purchase; and the how the channel or medium used for the sales transaction. Ideally, both the user's own sales order and competitive sales order information are available for the promotion pricing system 100 to model competitive factors. However, alternatives exist, as described below.

Competitive information forms another component driving the system 100's analysis of promotional schemes. This data identifying competitors helps to establish the competitive landscape. In addition to this base competitive data, raw sales order or market share data may be used to incorporate competitive information into the analysis. As laid out below, this information could manifest itself in either transaction or market share data. Competitive sales order data consist of sales transaction data on competitive products. If unavailable to the user, the Sales Order data could potentially be obtained from various third-party sources depending on the user's industry. In the event that Competitive Sales Order data is unavailable, the promotion pricing system 100 can use market size and market share information to model competitive factors. However, this lack of information may curtail the effectiveness of the competitive model.

Promotion or campaign information forms the third important ingredient required by the promotion pricing system 100. Promotion information describes in detail the nature of past or currently running campaigns and the incentives associated with each. This information includes a listing of prior promotions, the product segments and trading channels associated with the prior promotions, the nature of the promotions, the duration of the promotions, etc.

Using the above-described inputs, the promotion pricing system 100 analyzes a promotion scheme and produces several outputs, including promotion effectiveness and market response, price elasticity information, and cannibalization/dilution details. In determining price elasticity, the promotion pricing system 100 may generate both the user's elasticity and cross-elasticity of other products, sales channels or incentive types on market response. The resolution of the forecasts depends on the quantity and quality of sales order and competitive data available. If individual product forecasts cannot be reliably generated, elasticity at an aggregate level (or product segment group) is generated by the promotion pricing system 100.

Using this price elasticity information and baseline volume estimates taken as input from either the user or third-party systems, the promotion pricing system 100 can compute expected lifts (i.e., sales increases) for a given promotion program in terms of quantity revenue, margin, or other industry-specific metrics. These estimates are generated at the level product, incentive type, sales channel, and marketing channel levels. The promotion pricing system 100 may then use cross-elasticity determinations to compute cannibalization or dilution effects on a given product or sales channel from competing or surrogate products and sales channels.

Another functionality of the promotion system 100 is mark-down optimization. A retailer may receive shipments of excess inventory to their stores. The retailer knows how much of this inventory is normally sold within a given period of time given historical information and general business knowledge. However, they do not know the optimal discount to set to achieve the objective of selling that inventory within the specified time period. In other words, the user does not want to overdiscount a product. promotion system 100 can solve this type of problem given certain inputs such as the target product, the total initial inventory for that product, and the amount of inventory that is to be sold for a given period. Promotion system 100 would then compute that discount which maximizes profit while clearing pre-identified excess inventory during the specified period.

The promotion system 100 may also perform strategic objective analyses in assessing and achieving strategic corporate objectives. A user generally does not know if 1) an objective is obtainable, and 2) how strategically she should approach achieving this objective using promotional incentives. The promotion system 100 can solve this problem by identifying 1) if the revenue target is feasible, and 2) if the target is feasible, what promotional incentive level will maximize profitability given this constraint.

Product Segmentation 200

Figure 2:
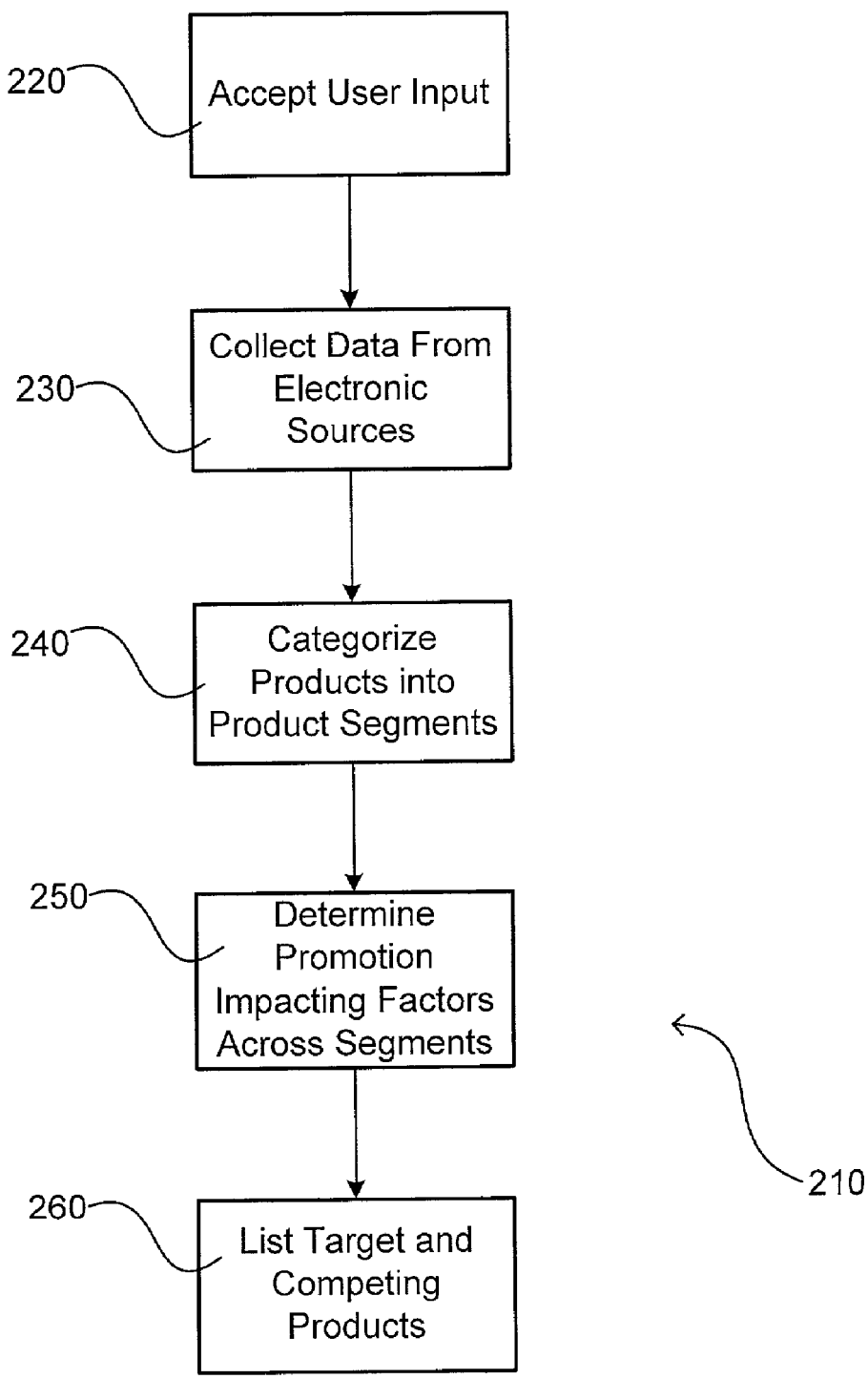
FIGS. 2–5, 6A–6B, and 7–13 represent steps implemented by the various components of the promotion pricing system of FIGS. 1A–1C.

The PSM 200 defines the products in the market model created and analyzed by promotion pricing system 100. Specifically, the PSM 200 creates and organizes a list of related products. As generally illustrated in FIG. 2, the PSM 200 may employ a production segmentation method 210 for collecting, organizing and presenting the product data. The user may input this data (Step 220), or the PSM 200 may collect data from a list of products, step 230. For instance, the PSM 200 may download data from a database containing product catalog information or may employ known data collection and mining techniques such as automated XML data crawling applications. Alternatively, the PSM may use defining product characteristics to select appropriated competing products in view of a list of the user's products. After acquiring the data, the PSM categorize products into product segments by similar behavior, attributes, or features, step 240. The categorization of the products may be generally accomplished by organizing the product data into a relational database and then employing standard query language (SQL) to organize the product data according to desired characteristics. In organizing the product data, the PSM 200 may determine promotion impacting factors including impacts across segments, step 250. The PSM 200 may then list the user's own target products along with associated, competing products, step 260. In this way, the PSM 200 also defines the suppliers to the market model created and evaluated by the promotion pricing system 100.

In another embodiment, the PSM 200 does not include competitors' products in the product segmentation. Instead, the PSM 200 only looks to the user's products. In this way, the collection and analysis of data are simplified at the cost of decreased accuracy. Particularly, the promotion pricing system 100 operates under the general assumption that transactions are independent events that differ only by promotional efforts. These assumptions become increasingly less likely with smaller sets of data and suppliers.

Customer Segmentation Module 400

Figure 3:
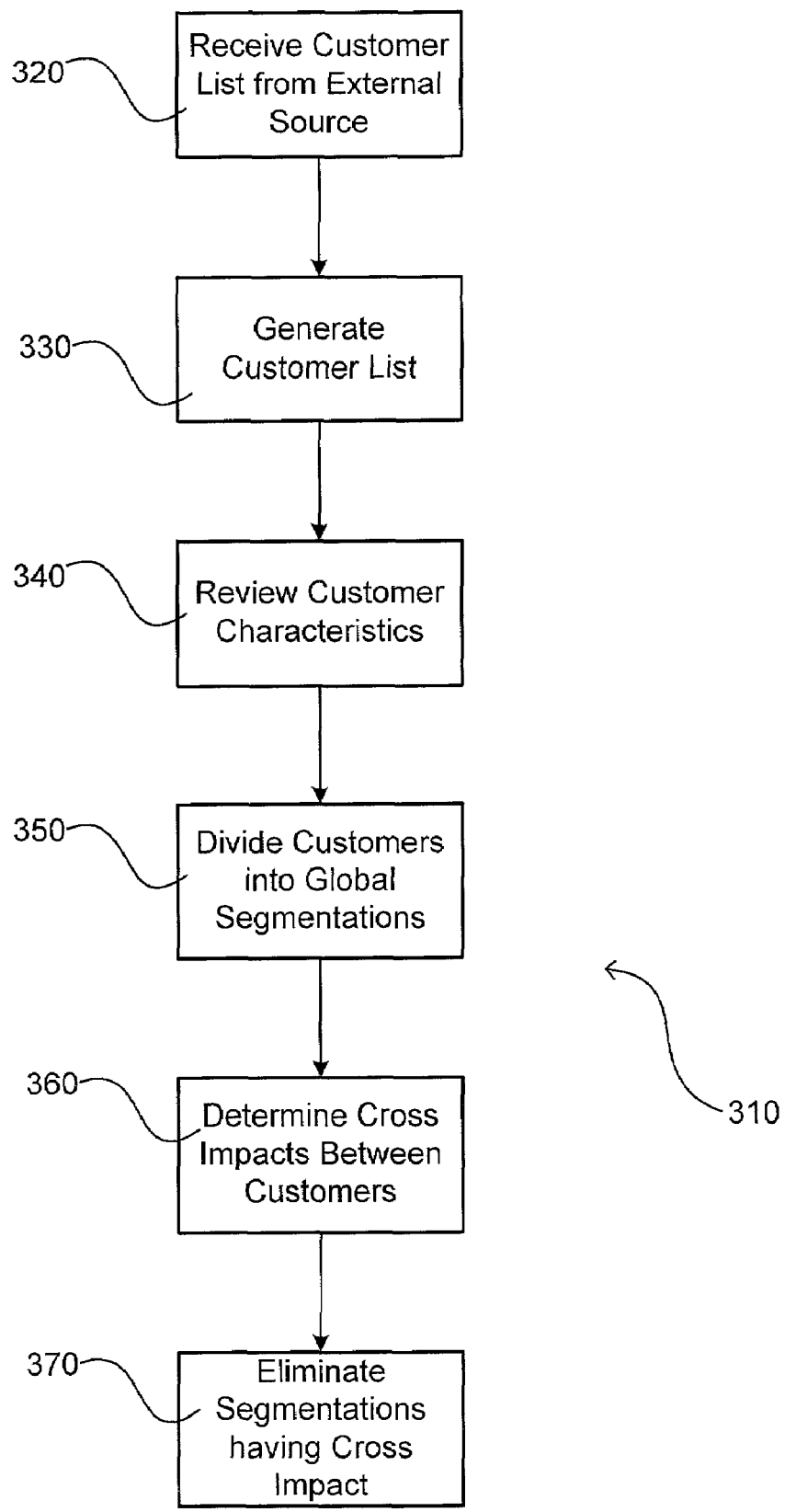

The CUSM 400 defines and categorizes the consumers of the products specified by the PSM 200 in the product segmentation method 210. The user may manually provide data for the segmentation of the customers or, more typically, the CUSM 400 may automatically segment the customer according to various demographic or market information. The CUSM 400 preferably automatically segments the customers using various characteristics. For instance, commercial consumers may be divided into categories of differing business sizes and revenue levels. The CUSM 400 may operate using a customer segmentation method 310, as illustrated in FIG. 3. In the customer segmentation method 310, the CUSM 400 first collects a list of customers for the products defined by the PSM 200. As with the PSM 200, the CUSM 400 may either receive the customer list from an external source, step 320, or the CUSM 400 may automatically generate the customer list, step 330. For instance, the CUSM 400 may analyze a record of past transactions involving the products designated by the PSM 200. The CUSM 400 next reviews customer characteristics, step 340. The analysis of the customers may be generally accomplished by organizing the customer data into a relational database and then employing SQL to organize the customer data according to desired characteristics, such as geographic location. The CUSM 400 then divides the customers into different possible global customer segmentations, each with two or more segments, step 350. Using historical transaction data, the CUSM 400 may further determine cross impacts between customer segments, step 360. The CUSM then keeps only the customer segmentations without cross-impact between different segments, step 370. The CUSM 400 only looks to customer categories in which sales are independent events to avoid covariance terms in the mathematical evaluation of the market model created by the promotion pricing system 100. In other words, sales to one consumer segment of the market should not effect demand from other consumer segments.

Incentive Typing Module 300

Figure 4:
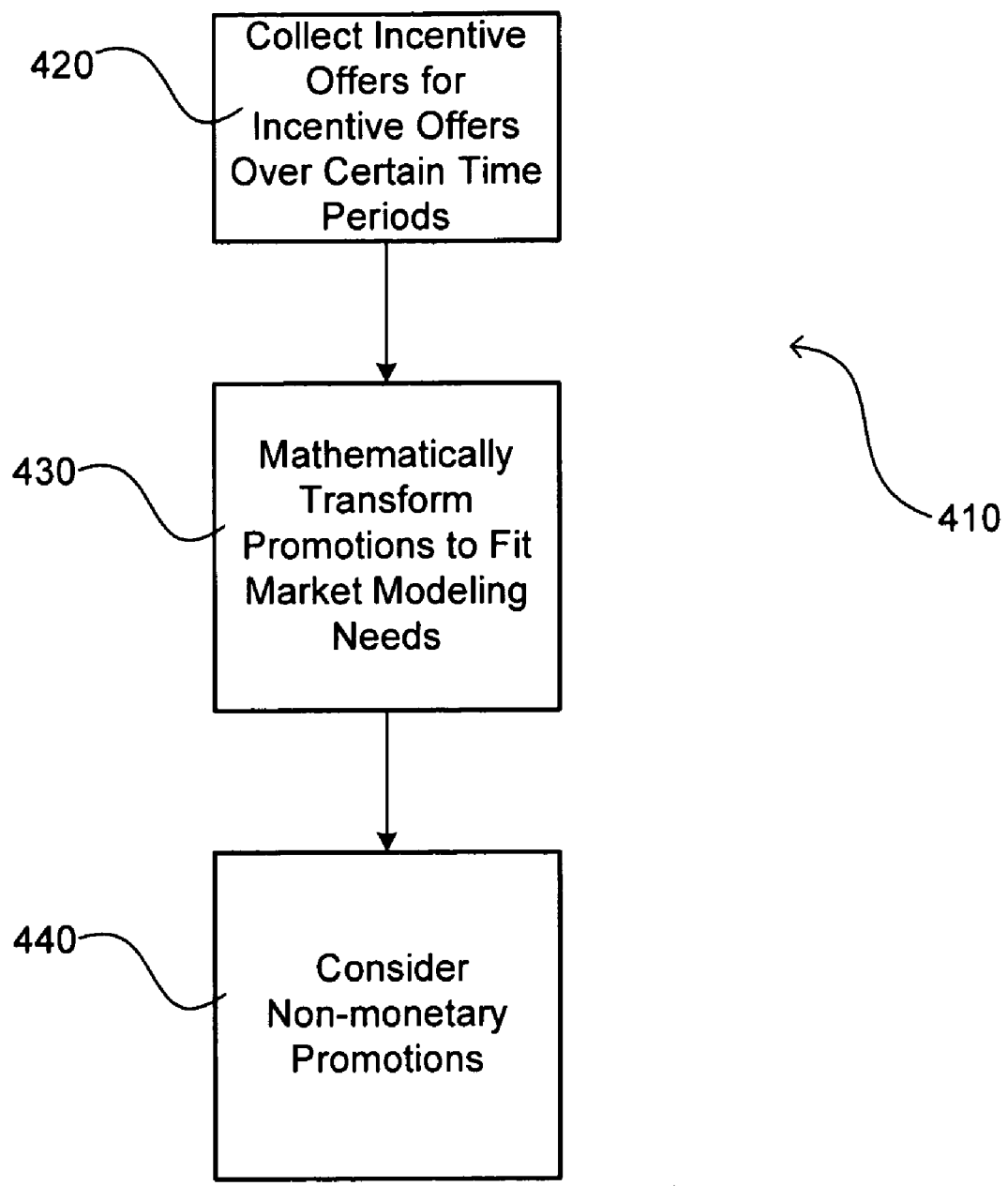

The ITM 300 collects and organizes data related to various promotional techniques. The ITM 300 may employ an incentive typing method 410, as illustrated in FIG. 4. In the incentive typing method 410, the ITM 300 collects incentive offers for promotion programs over certain time periods, step 420. The ITM 300 specifies different incentive types associated with promotion programs for both the user's own target products and competitors products identified by the PSM 200. For instance, the incentives may include rebates, discounts, low-rate financing, bundled goods, etc.

During step 420, the user may provide the promotion data, or the ITM 300 may evaluate prior transactions to determine historically employed promotional techniques. The ITM 300 then translates the incentive offers into consistent measurable drivers by incentive types, step 430. In step 430, the ITM 300 may mathematically transform the promotions to best fit market modeling needs.

In another embodiment, the ITM 300 may further consider non-monetary promotions, step 440. For instance, the ITM 300 may add to the list of incentives non-monetary incentives such as prominent display or advertisement of the products. The non-monetary incentives identified in step 300 may typically be specified by the user, prespecified in the ITM 300, or may be dynamically determined from transaction data.

Data Aggregation Module 500

Figure 5:
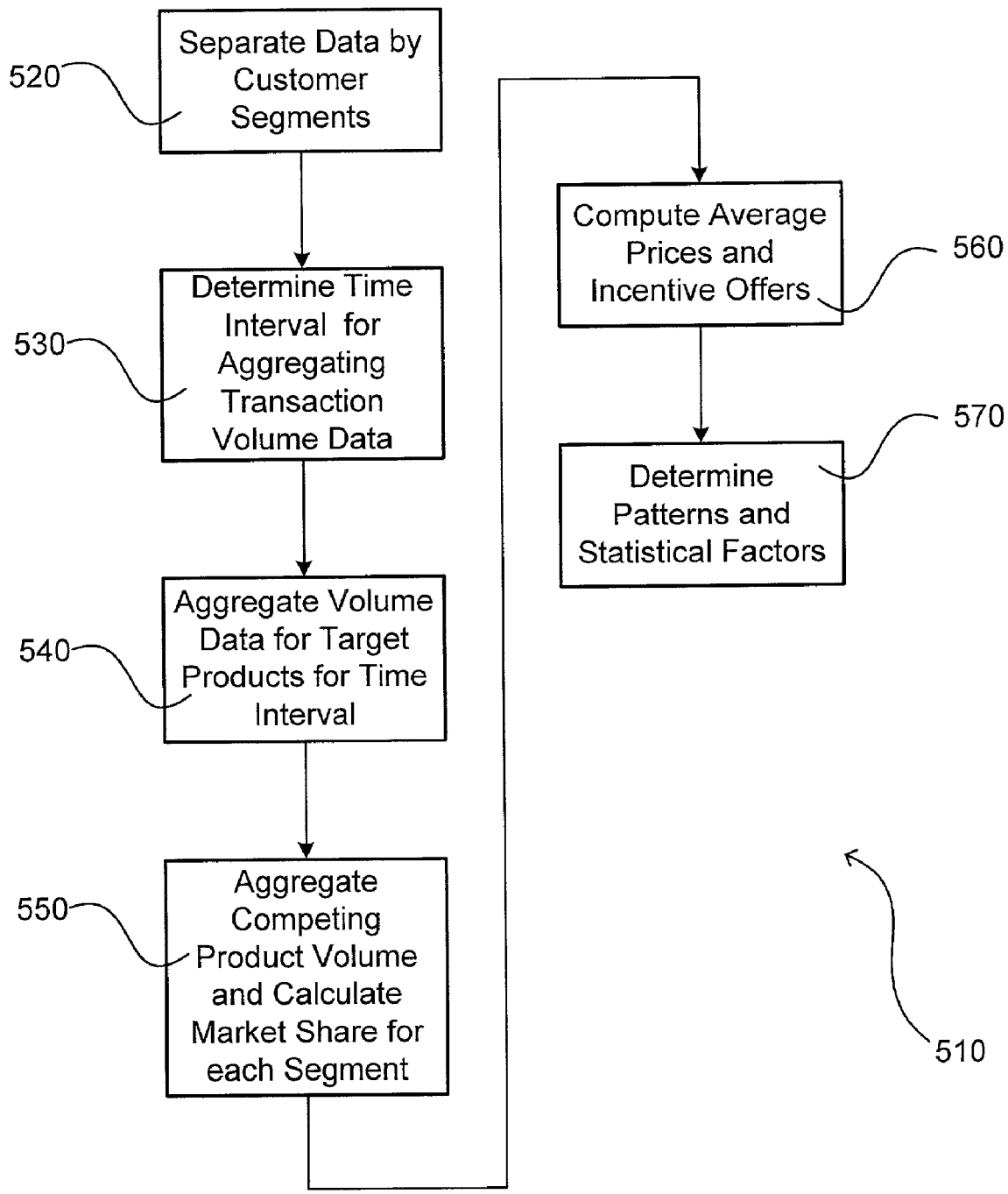

After the PSM 200, CUSM 300, and ITM 400 define the market to be modeled, the DAM 500 evaluates historical transactions in view of the various defined products, customers, and promotional techniques. Specifically, the DAM 500 may employ the data aggregation technique 510 depicted in FIG. 5. In step 520, the DAM 500 may separate data by customer segments. The separation may be automated or specified by the user. The DAM 500 may then determine a time interval at which to aggregate transaction volume data, step 530, on the basis of the number of time periods needed to estimate parameters, the incentive offer and price variation cycle, and data collection frequency. The DAM 500 then aggregates volume data at selected time intervals for target products, step 540. If the products are clearly segmented, the DAM 500 aggregates competing product volume at the same time interval, and calculates corresponding market share under each segment, step 550. The DAM 500 then computes average prices and incentive offers by each channel for each product over each time interval, step 560. The DAM 500 then uses statistical analyses techniques to determine patterns, such as seasonality, and other statistical factors, step 570. The output of the DAM 500 is typically a relational database in which each historical transaction has been characterized by product segment, customer segment, and incentive type.

Model Selection Module 600

Figure 6A:
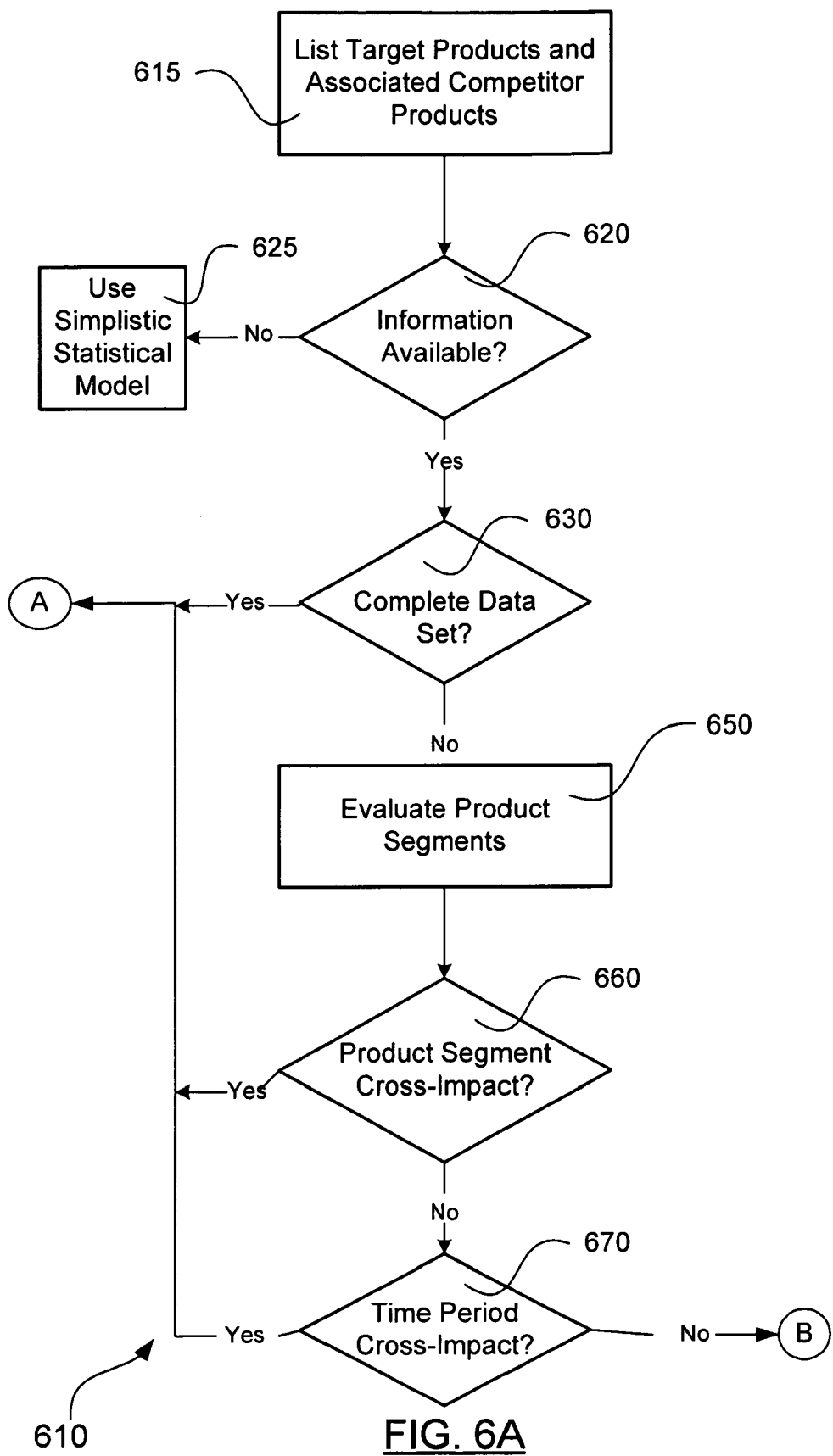
Figure 6B:
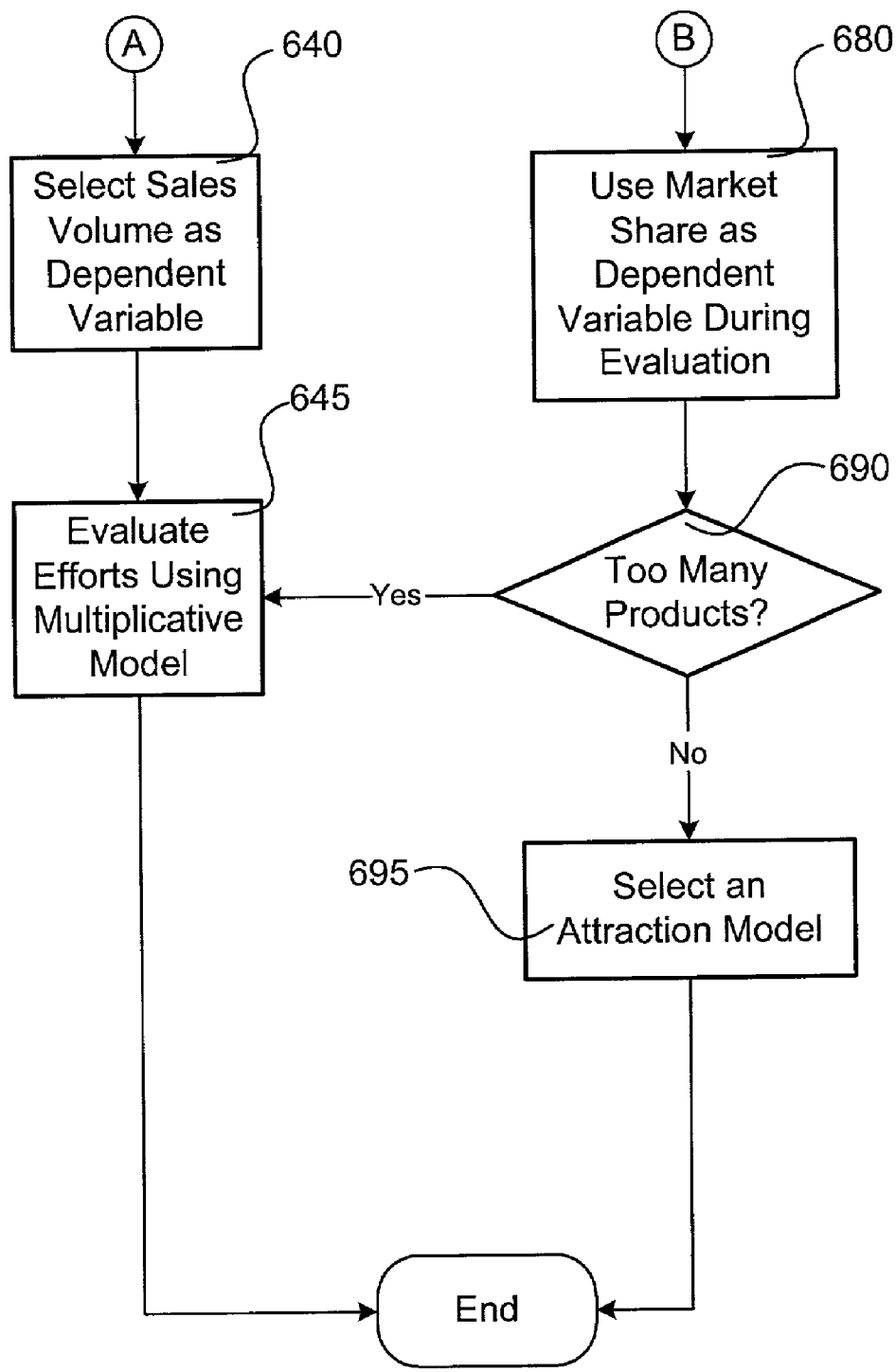

The MSM 600 then uses the aggregated data created by the DAM 500 to select an appropriate model for use in analyzing and accessing promotional efforts. The MSM 600 generally employs a model selection process 610 depicted in FIGS. 6A–B. In the model selection process 610, the MSM 600 first lists the user's own target products and lists all associated products from the user's competitors, step 615. At determination 620, the MSM 600 evaluates whether competitor information is available. If competitor information is not available, a simplistic statistical model is used to model the promotions with the penalty of lower accuracy, step 625. The simplistic model is described in greater detail below. Furthermore, the promotion pricing system may initially use the simplistic statistical model and change to more precise promotion evaluation models as more data becomes available.

If competitor information is available, then at determination 630, the MSM 600 decides whether a substantially complete set of product volume data is available over the time periods of interest. If a substantially complete set of product volume data is available over the time periods of interest, then the dependent variable during evaluation is sales volume, step 640, and the promotion pricing system 100 evaluates promotion efforts using a multiplicative model described in greater detail below, step 645.

If only samples of the user's and competitors' products volume data over time are available for the time period of interest, the MSM 600 evaluates the product segments defined in the PSM 200, step 650. At decision 660, the MSM 600 determines whether there is apparent cross impact among these segments. Likewise, at decision 670, the MSM 600 determines whether any of the promotion programs substantially overlap over different time periods of interest. If there is an apparent cross impact among these segments or any of the promotion programs substantially overlap over different time periods of interest, then the dependent variable during evaluation is sales volume, step 640, and the MSM 600 selects the multiplicative model for use during the promotion pricing system's 100 evaluation of promotional efforts, step 645. If there is neither an apparent cross impact among these segments nor substantial overlaps in promotions over different time periods of interest, then the MSM 600 uses market share as the dependent variable during evaluation, step 680. The MSM then decides whether there are too many products in each segment defined by the PSM 200, determination 690. Generally, the MSM 600 looks to see if the number of products in each segment exceeds a predetermined maximum. If there are too many products in each segment, the MSM 600 again selects the multiplicative model for use during the promotion pricing system's 100 evaluation of promotional efforts, step 645. If the MSM 600 determines that there are not too many products in each segment during determination 680, the MSM 600 selects an attraction model for use during the promotion pricing system's 100 evaluation of promotional efforts, step 695. The attraction model for evaluating promotions is described in greater detail below.

Calibration Module 700

In evaluating a promotion, the subjective variable of attractiveness or utility does not really exist. To calibrate the model, the user may use Market Share (actually the natural logarithm of market share) or sales volume to represent the attractiveness, or utility, of the product i, deal type j. In particular, the CM 700 evaluates the above-described inputs and produces the outputs results using different models that guide the data analysis. For instance, the CM 700 may use either a multiplicative model that measures market share or sales volumes. Alternatively, the CM 700 may use an attraction model that measures market share. Specifically, the CM 700 determines the values for the dependent variables designated above in step 640 and 690. The CM 700 further integrates new transaction data to adjust values of the dependent variable. In turn, as described below, the EM 800 uses the values for the dependent variables to access various promotional planning schemes. The operation of the CM 700 varies according to the model selected by the CSM 600.

Multiplicative Model

The multiplicative model assumes constant elasticity over market share and driver level and is defined by the following equation 1a:

$$Y_i = \exp(\alpha_i + \varepsilon_i) * \prod_{k=1}^{K} X_{ki}^{\beta k} \qquad (1a)$$

where
- $Y_i$=the utility of product i as measured by either volume and market share;
- $\alpha_i$=the marketing effectiveness of the brand of product i;
- $\varepsilon_i$=the noise;
- K=the total number of effects considered;
- $X_{ki}$=the $k^{th}$ marketing instrument on product i and can be prices, incentive offers, or other factors; and
- $\beta_k$=the parameter for effect k that are global over the set of considered products.

If $Y_i$ is in sales volume, the calibration could be done for target products only. By taking the natural logarithm of both sides, Equation 1A may be rewritten as Equation 1B.

$$ln(Y_i) = \alpha_i + \sum_{k=1}^{K} \beta_{ki} \ln(X_{ki}) + \varepsilon_i \qquad (1B)$$

Alternatively, $Y_i$ may be defined as the natural logarithm of the utility of product i as measured by either volume or market share, as represented in equation 1C:

$$Y_i = \alpha_i + \sum_{k=1}^{K} \beta_k \ln(X_{ki}) + \varepsilon_i. \qquad (1C)$$

As can be seen from equations 1A–1C, the dependent variable in the multiplicative model is either sales volume or market share. The use of sales volume as the dependent variable raises concerns of seasonality and trend factors in the transaction data, whereas market share tends to be more stable over different time periods. For instance, the sales volumes of many products are higher during the Christmas season regardless of promotion schemes. Furthermore, the elasticity in the multiplicative model is equal to P and is constant over market share and driver levels. Accordingly, the multiplicative model is generally dependent on the user's sales volumes data but does not look to competitors' transaction data. Also, because it is easy to aggregate sales volume over multiple time periods, it is fairly simple to incorporate data from different time periods.

Attraction Model

In comparison with the multiplicative model, the attraction model uses only market share as a dependent variable and assumes constant total sales quantities. In this way, the attraction model incorporates data from competitors' transactions. Specifically, the attraction model uses the following equation to measure a product's utility and to quantify any change in the value or "utility" of product caused by a promotion.

$$A_i = \exp(\alpha_i + \varepsilon_i) \prod_{k=1}^{K} f_k(X_{ki})^{\beta_k} \qquad (2A)$$

where
- $A_i$=the utility of product i in market share;
- $\alpha_i$=the marketing effectiveness of the brand of product i;
- $\varepsilon_i$=the statistical noise;
- K=the total number of effects considered;
- $X_{ki}$=the $k^{th}$ marketing instrument on product i;
- $\beta_k$=the parameter for effect k that are global over the set of considered products; and
- $f_k$=a function, such as Id, depending on the driver.

The attraction model embodied in equation 2A does not take into account effects induced by any competitors, or any effect other than the ones generated by the product, the brand's product or exterior global parameters such as the trend. Also, the variables used can be either quantitative, such as price and age, or qualitative, such as trend or the belonging to a specific category.

Once the utility of a product (i.e., product i) is known, the market share of this ith product among the specific market segment is calculated using equation 3:

$$s_i = \frac{A_i}{\sum_{j=1}^{m} A_j} \qquad (3)$$

where
- $s_i$ is the market share of product i;
- $A_i$ is the utility (market share) of product i;
- m is the number of considered products in the segment; and
- $\Sigma A_j$ is the total utility (market share) of m product in the segment.

Alternatively, the promotion pricing system employs a differential-effect version of the attraction model. In differential-effect version of the attraction model, the parameters of the attraction model are product-specific instead of being global. Therefore, equation 2A becomes:

$$A_i = \exp(\alpha_i + \varepsilon_i) \prod_{k=1}^{K} f_k(X_{ki})^{\beta_{ki}} \qquad (2B)$$

where notations remain the same.

Even greater accuracy in the attraction model may be achieved by the promotion pricing system by adding new influences to the model to reflect a more realistic market. Particularly, the influences of the competitor's product can be added to the calculation of the utility of a product. This modification addresses the possibility of cross-impacts caused by similar competitive products that can influence the attraction of the product being considered. Equation 2B is thereby modified to product equation 2C:

$$A_i = \exp(\alpha_i + \varepsilon_i) \prod_{k=1}^{K} \prod_{j=1}^{m} f_k(X_{ki})^{\beta_{ki}} \quad (2C)$$

The calculation of the market share remains the same, as described above.

In application, a user may use transformations to simplify equations 2A–2C. For instance, logarithmic transformations may be used to make the estimation of the parameters a linear process. In this way, Equation 2B may be rewritten as $$A_{ij} = \exp\left(\alpha_i + r_j + \sum_{k=1}^{K} \beta_{i,jk} X_{i,jk} + \sum_{i,j \in C} \sum_{k=1}^{K} \beta_{i,jk} X_{i,jk}\right) \quad (2D)$$

where:
I=set of products
J=a set of promotion types
C=set of products/deal types that have asymmetric cross impacts on the target vehicle
$A_{ij}$=attraction of the product i, deal type j
$\alpha_i$=constant influence of vehicle i
$r_j$=constant influence of deal type j
$x_{ij,k}$=$k^{th}$ driver vehicle i, deal type j
$\beta_{ij,k}$=$k^{th}$ parameter of vehicle i, deal type j
K=total number of drivers As can be seen from above equations 2A–2D, the elasticity in the attraction model varies by market share and driver levels.

It should be appreciated that these models may be modified and/or combined as needed by the user. Likewise, other models may be incorporated within the operation of the promotion pricing system of the present invention. These and other similar modifications to the present invention are anticipated within the present application and considered within the scope of the present invention.

Figure 7:
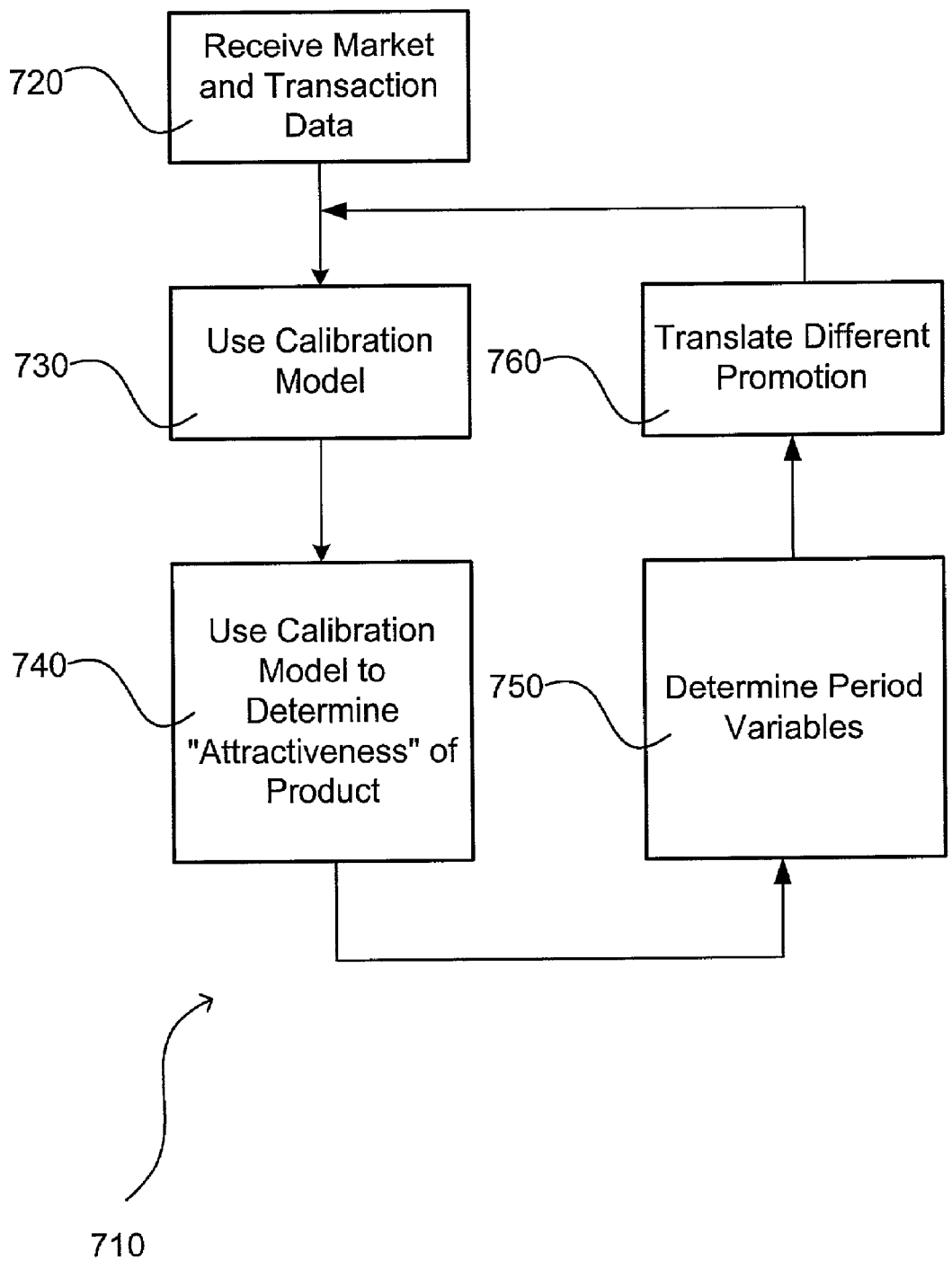

The CM 700 uses a calibration method 710 as illustrated in FIG. 7. The CM 700 first receives data from the modules 200–600 as well as historical transaction data, step 720. The CM 700 next evaluates the data using one of the models for determining the utility of a product, step 730. Once all parameters have been obtained, the attractiveness of the target incentive could easily be calculated, and so can the market share, $S_{ij}$, step $$S_{ij} = A_{ij} / \Sigma_{ij} A_{ij} \quad (4)$$

where $\Sigma_{ij} A_{ij}$ represents is the sum of utilities for the sub-segment of the target vehicle.

The CM 700 may also determine period variables, step 750. The period variables account for the fact that the sum of market shares in a subsegment, in a period of time, equals one. Theoretically, the dependent variable in the regression is utility. Since this variable does not really exist, the Manufacturer may use Market Share to represent utility with certain adjustments. The following equation shows the relationship between Utility and Market Share.

$$MarketShare_i = \frac{Utility_i}{\sum_j Utility_j} \quad (5A)$$

where $j \in (1, J)$ is the subsegment to which vehicle i belongs.

$$\sum_j Utility_j$$

does not depend on i, but only depends on time/month. This means that $$\sum_j Utility_j$$

will be the same no matter which of two products are used, assuming two products are in the same subsegment. However, the sum of $Utility_j$ does when with different periods of time. The CM 700 may rewrite the above equation:

$$MarketShare_i = \frac{Utility_i}{f(month)} \quad (5B)$$

$$Utility_i = MarketShare_i \times f(month) \quad (6A)$$

Then, $$ln Utility_i = MarketShare_i \times f(month) \quad (6B)$$

When using ln(MarketShare) to represent ln (Utility), the CM 700 should not exclude ln (f(month)) from the model. Thus, the period variable, some function of month, has been incorporated in the model.

The CM 700 operates using several assumptions to improve accuracy as well as decrease required processing time. For instance, the CM 700 assumes that there is no cross impact between customer segments. Please note, however, that there may be cross-impact among product segments, e.g., a promotion of computers may indirectly promote the related peripherals. Furthermore, with the multiplicative model, the value for share or volume elasticity is assumed to be equal to a corresponding $S_{ki}$, as defined below. Likewise, for the attraction model, the market size for each product segment is fixed at a specific time period, and all market segments should be included or $\Sigma S_i = 1$.

The CM 700 may function as a modules promotion translator that translates the different promotions offered into the appropriate driver of a product, step 760. The driver represents the actual impact of the promotion on customers' valuation of the product and competitive products. For instance, customers may be indifferent between discounted prices and reduced interest rate financing because either promotion may allow the customers to pay the same periodic and total payments. It should be appreciated that the term "incentive" may also be used to refer to an aggregate of separate offers. There are no functional requirements concerning the value of the drivers. However, there may be some requirements due to the mathematical process used within the various models.

Evaluation Module 800

Figure 8:
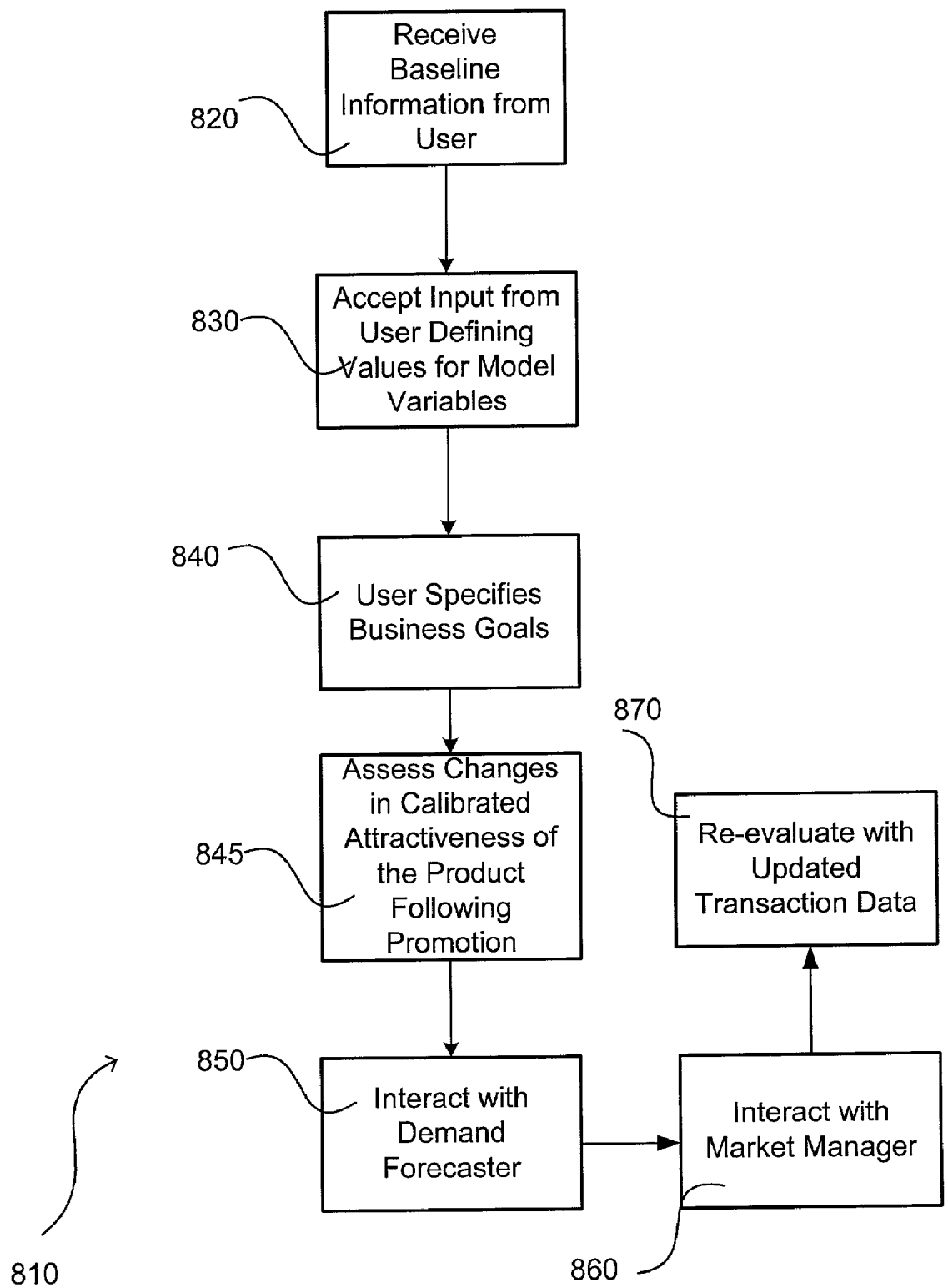

The EM 800 accesses the promotion scheme using the calibration results produced by the CM 700 in method 710. Specifically, the EM 100 uses the evaluation method 810, as depicted in FIG. 8. During evaluation, the EM 800 receives baseline information from the user, including sales volume information for the attraction model, information of the user's promotions, and competitors to the related products ups, assuming the same promotions existing offers across customer segments, step 820. If the market share is predicted by the multiplicative model, the share elasticity should be evaluated instead of volume in step 820. The user may also input values for predicting variables to get responses for an adjusted program, though incentive offers to one customer segment could be distinctive from the other, step 830. For the attraction model, the user may input the total baseline volume $V_i$ for the product over interest over the defined customer segments, the baseline volumes for other choice sets can be derived by market shares and overall customer segment ratio as follows. For example, $$r_i = V_{i1}/V_i = r*S_{i1}/[r*S_{k1}+(1-r)*S_{i2}] \quad (7)$$

$$V_{i1} = V_{i1}*S_{j1}/S_{i1} = V_i*r*S_{j1}/[r*S_{i1}+(1-r)*S_{i2}] \quad (8)$$

$$V_j = V_i*[r*S_{j1}+(1-r)*S_{j2}]/[r*S_{i1}+(1-r)*S_{i2}] \quad (9)$$

The adjusted program volume will be $$Va_j = V_i[r*Sa_{i1}+(1-r)*S_{j2}]/[r*S_{i1}+(1-r)*S_{i2}] \quad (10)$$

In one embodiment, the EM 800 may also allow the user to specify or select business goals, such as profit maximizing or sales volume maximization, step 840. For instance, the user may wish to maximize sales and may accept losses on the sales to accomplish the increased sales volume or market share. When evaluating the promotion in view of the business goals specified in step 840, the EM 800 may access constraints created by the CGM 900 described below. In this way, the EM may determine which goal may be accomplished while adhering to the specified constraints.

When performing profit maximization, the EM 800 predicts the ability of the promotion scheme to change profits, step 845. The EM 800 looks to the sales price and the expected change in sales for a product. The EM 800 then uses these values to estimate expected revenues attributable to the promotion scheme. Where the EM 800 cannot measure costs, it proposes a revenue maximizing promotion scheme. The EM 800 may also receive an estimate of costs produced by the COSM 1000, as described below. The EM 800 may then find the expected profits attributed to the promotion scheme by subtracting estimated costs from the estimated revenues.

In other embodiments, the EM 800 may also cooperate with other applications to increase the accuracy of the evaluation. For instance, the EM 800 may cooperate with a known demand forecasting application, step 850, such as NetWORKS Demand™ produced by Manugistics, Inc. of Rockville, Md. The demand forecaster acts as an early-warning system, predicting future customer demand, alerting of potential supply problems, and finding patterns undetected by traditional solutions. It enables a user to understand demand drivers, to more accurately predict future needs, and to unify disparate planning processes through its scalable and web-based multi-model architecture. In this way, the EM 800 may separate demand changes caused by market forces from sales changes resulting from a promotion.

The EM 800 may also integrate with known market management applications to control inventory supply levels in a market through promotions, step 860. For instance, NetWORKS Market Manager™ produced by Manugistics, Inc. of Rockville, Md. provides a global view of all market activities that are happening for a product, location, or product family, simplifying the process of coordinating market activity information related to market promotions. In operation, EM 800 predicts and evaluates the ability of suggested promotions to the to predict the availability of the suggested promotion to achieve goals desired by the market management application.

As additional transaction data becomes available, the EM 800 may integrate this data into the evaluation, step 870. Specially, the EM 800 may adjust the utility values produced using either the multiplicative method or the attraction method to reflect actual sales data related to a promotion. In this way, the EM 800 may also look to actual sales and adjust the prior predictions.

Constraints Generation Module 900

Figure 9:
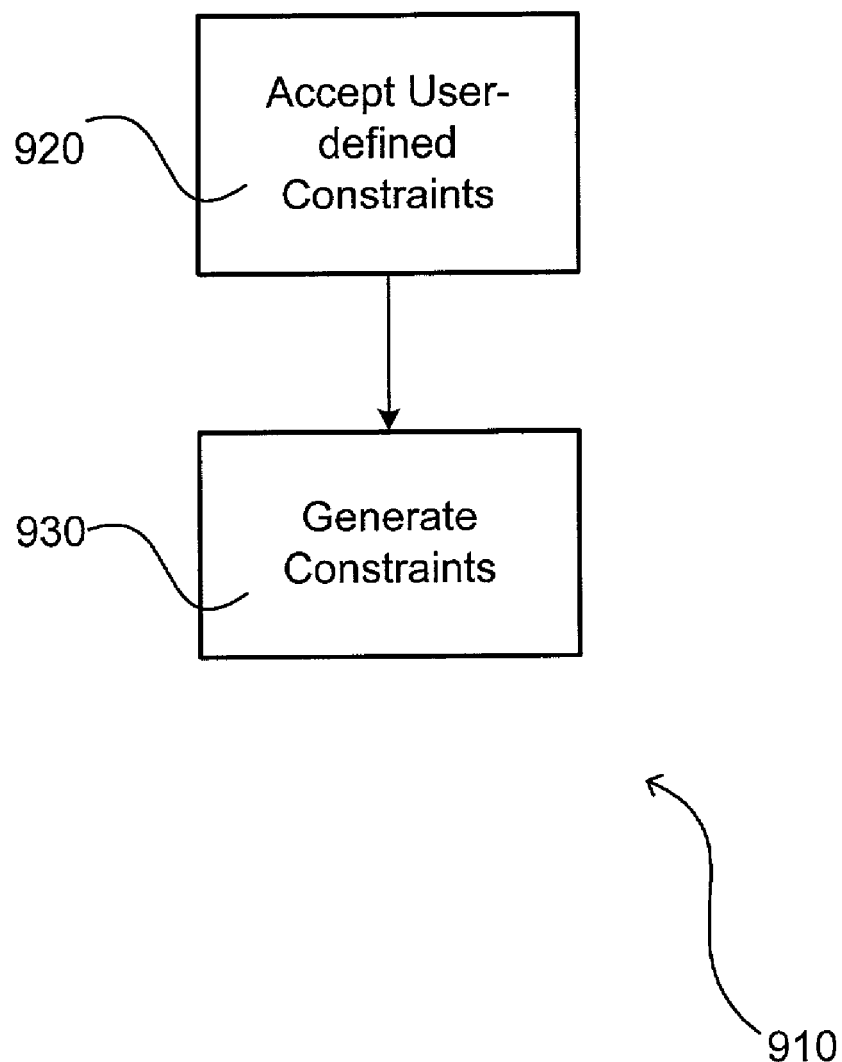

The CGM 900 functions to accept, create or define various constraints on the variables used in the other components of the promotion pricing system 100. The CGM 900 operates according to a constraints generation method 910 depicted in FIG. 9. The CGM 900 first accepts user defined constraints, step 920. Alternatively, the CGM 900 may generate constraints, step 930, based on inputs from the user or prespecified settings. Possible constraints include directionality constraints to enforce the assumption that a promotion scheme should only positively affect product utility. Another possible constraint is to assume equal cross impact, thereby assuming that increase in sales volumes of market share are equally taken from other competitors, thereby simplifying the promotion assessment calculations. Another set of constraints relate to the incrementality, or the minimal intervals between usable values for the variables in the calibration and assessment. For instance, rounding the values for a variable may decrease accuracy but decreases the computational accuracy. Application of constraints may restrict regular significance tests of estimated parameters, but the calibration process will provide adjusted $R^2$ to evaluate model fitness.

COSM 1000

Figure 10:
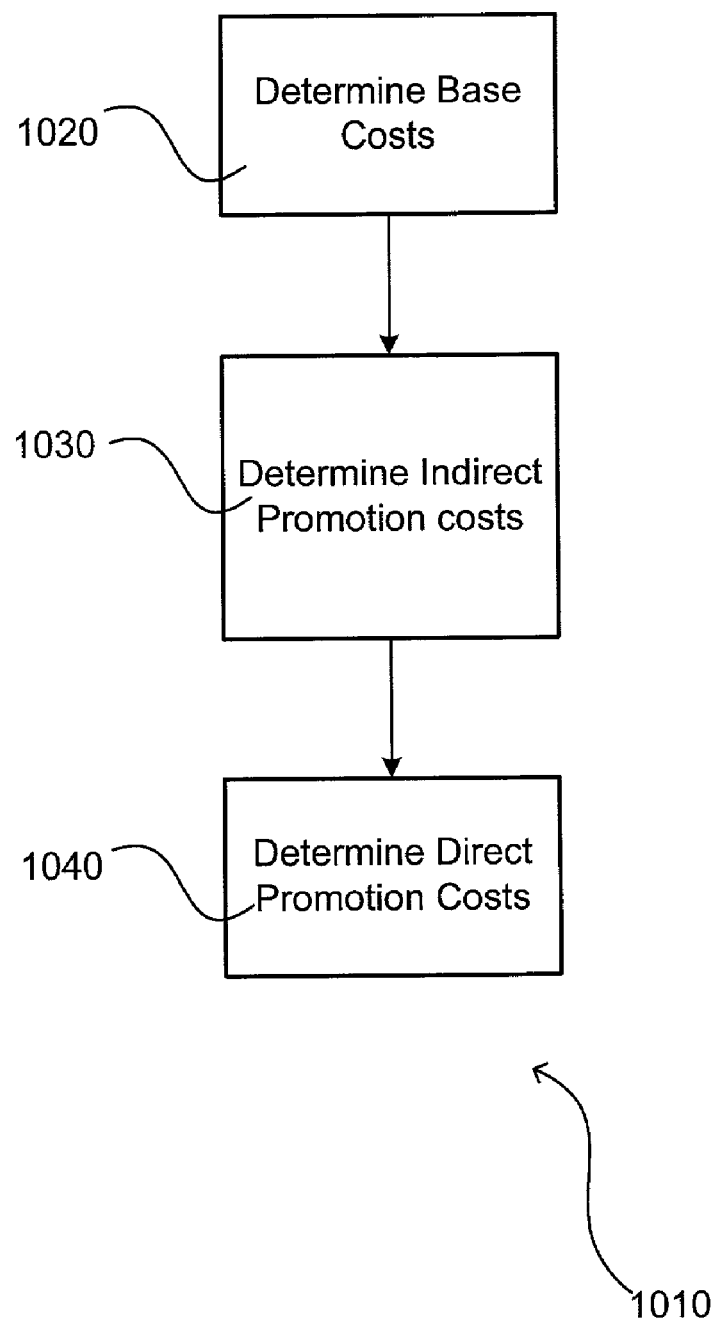

The COSM 1000 functions to determine costs for the promotion schemes. As described in the cost organization method 1010 and illustrated in FIG. 10, the COSM 1000 first determines base product cost without the promotion scheme, step 1020. The COSM then determines indirect promotion costs caused by the promotion scheme, step 1030. In particular, the COSM 1000 looks to, for example, the increased costs per unit associated with increased sales volume or share from the promotion. The COSM 1000 next determines the direct costs for the promotional scheme, step 1040. For instance, the COSM 1000 may determine incentive costs, offer channel cost, customer segment cost, order channel cost, etc. The COSM 1000 then sums the indirect and direct promotion scheme costs to determine a total cost.

Optimization Module 1100

One common question facing businesses is which products should be targeted for promotional incentives (i.e., discounts) and at what level should these discounts be set? The OM 1100 can provide the answer to this question. Specifically, the OM 1100 will identify the optimal discount for each product (which generates the highest profitability) and rank products by profitability (given the recommended incentive).

To guide the operation of the OM 1100, the user can establish business constraints to better reflect the needs of their business. For example, in the set fixed incentive levels, the user can identify an incentive level that should apply for any selected products or segments (i.e., all menswear should be discounted at 15%). In equality constraints on incentive levels, the user can specify that the discount for dress slacks should always be equal to the discount for dress shoes. With Min/Max constraints on incentive levels, the user can set a maximum discount level (i.e., max discount of 50% assuring that the effective price of the product remains above that of lesser product lines), or minimum discount level (i.e., min discount level should remain above 6% to assure customer satisfaction and ease of communication). Min/Max constraints on margin allows the user to ensure that the recommended discount level will not erode the objective per unit margins for a product (i.e., the margin for dress slacks must remain above 4%). Minimums can also be set (i.e., we must achieve at least a 10% margin on the sale of dress shirts). Similarly, set fixed margins allows a target margin to be established (i.e., all products within the casual wear product line must have a margin of 14%). With Min/Max incentive budget at global level, the user may specify a total "Incentive Budget" for a given time period (i.e., the total amount of cash back incentives should not exceed $800,000 for the next fiscal year, or the total dollar amount of cumulative discounts must not exceed $10,000). Inventory constraint allows the user to specify an inventory amount to prevent product shortages resulting from a sale (i.e., for a summer promotion, users only have 20,000 t-shirts available, and therefore, should set the discount level to maximize profitability for this number of units). Likewise, through a demand target, users identify the number of units to be sold for a given period (i.e. in March, the user would like to sell 5,000 units of Dress Slacks).

The OM 1100 will identify the Promotional Incentives that maximize profitability given general user inputs. This is a highly intelligent feature that offers significant value in solving a variety of "real-world" business issues.

The optimization feature is related to the above-described strategic objective analysis feature, which evaluates several promotions to meet a target revenue. As an example, an apparel retailer may desire to increase profitability. The retailer offers a variety of product lines, of which Dress Slacks and Button-Down Shirts have recently encountered increased sales as a result of the popularity of designs. Additionally, there are a variety of Store Groups that the retailer can utilize to generate sales. In particular, Western Region stores currently have not been showing reasonable profitability. This retailer historically has offered flat discounts at the product level to generate sales. The issue is the selection of which products should be targeted for promotional incentives (i.e., discounts) and at what level should these discounts be set? Promotion system 100 can provide the answer to this question by identifying a group of products to consider for promotions and the promotional incentive type (i.e. discount). Thus, the OM 1100 will:

(1) Identify the optimal discount for each product/store group/sales channel combination (which generates the highest profitability); and (2) Rank product/store group/sales channel combinations by profitability (given the recommended incentive).

By employing the OM 1100, the user can identify which products within the dress slacks and button down shirts should be targeted for promotions, what the promotional incentive should be for each (i.e., discount), and how this will affect the overall profitability of the Western Region store group.

Additionally, the user can establish business constraints to better reflect the needs of their business. For example, the user may define the following business constraints. For instance, the user may set fixed incentive levels which can identify an incentive level that should apply for any selected products, store groups or sales channels (e.g. all menswear should be discounted at 15%). For Example, the user may use equality constraints on incentive levels that can specify that the discount for dress slacks should be the same across all regions.

The Min/Max constraints on incentive levels can be set at a maximum discount level (e.g. max discount of 50%), or minimum discount level (e.g., min discount level should remain above 6% to assure customer satisfaction and ease of communication). The Min/Max constraints on margin allows the user to assure that the recommended discount level will not erode the objective per unit margins for a product (e.g., the margin for Dress Slacks must remain above 4%).

Maximums can also be set (e.g. we can have at most a 10% margin on the sale of Dress Shirts). The user may set fixed margins which allow a target margin to be established (e.g., all products within the casual wear product line must have a margin of 14%) by setting the Min/Max incentive budget at global level, the user may specify a total "Incentive Budget" for a given time period (e.g., the total amount of cash back incentives should not exceed $800,000 for the next fiscal year, or the total dollar amount of cumulative discounts must not exceed $10,000). The inventory constraint allows the user to specify an inventory amount to prevent product shortages resulting from a sale (e.g., for summer promotion, only have 20,000 t-shirts available, and therefore, should set the discount level to maximize profitability for this number of units). And, the demand target helps the user identify the number of units to be sold for a given period (e.g., in March, sell 5,000 units of Dress Slacks).

Figure 11:
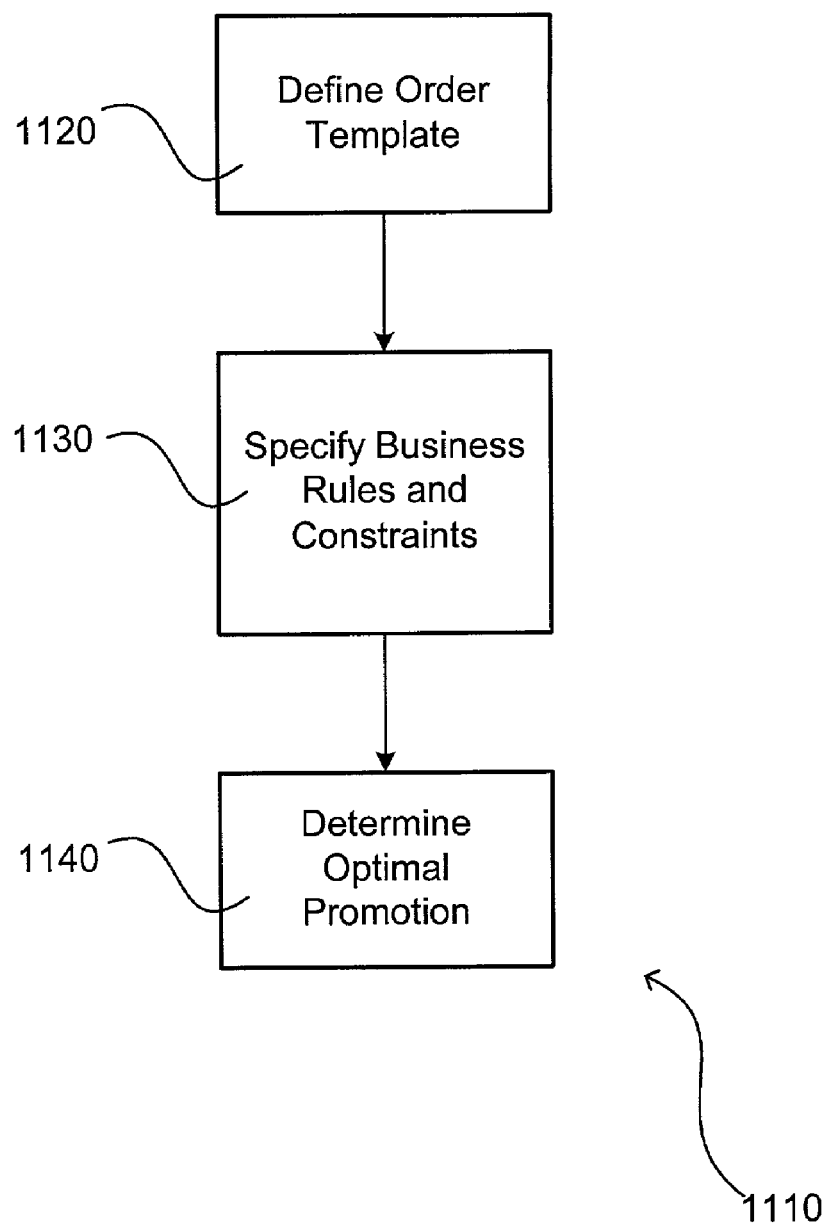

The OM 1100 allows the user to select the promotion that maximizes profit, subject to certain constraints. This is particularly useful if the market response model incorporates cannibalization or affinity relationships. As illustrated in FIG. 11, the OM 1100 employs an optimization method 1110. The first step 1120 is to define an offer template. This generally consists of product/sales channel combinations, target customer segment, target incentive type and a time period. These may be defined according to previously defined methods, 210, 310, 410, and 510. An offer is made to a list of choices, where a choice is a combination of customer segment, product, and channel. For each choice, there is an incentive type (e.g., cash back, discount), and an incentive level (e.g., $20 off, 5% off). An offer template has the same form as an offer, with the following exception. An offer has associated incentive levels (e.g., level of discount, APR). For example, printer at 20% off, computer at $100 off (assuming "printer" and "computer" are choices). In an offer template, some of the incentive levels that take on real values may be set to be VARIABLE. So, for example, printer at VARIABLE % off, computer at $100 off might be part of an offer template. Each offer template has instances associated with it. For example, printer at VARIABLE % off, computer at $100 off would have, as an instance, printer at 20% off, computer at $100 off.

In step 1130, the user specifies business rules/constraints. There are generally three types of constraints: incentive constraints (which apply at the group level), financial constraints (which apply at the global level), and volume constraints (which apply at the product level). Incentive constraints apply at the group level. A group is a set of product/channel combinations that have been selected together by the user. For a group, there are several allowable types of incentive constraints, including:

- Set fixed incentive levels. The user can set the incentive level to be a certain fixed amount (e.g., 7%) for all choices in the group.
- Equality constraints on incentive levels. The user can specify that all the incentive levels must be the same for all choices within the group. If this is not the case, then the incentive levels can vary independently.
- Min/Max constraints on incentive levels. The user can specify that all the incentive levels within the group lie between specified min and max values. The user may specify a min or a max or both.
- Set fixed margins. Margin for a choice is defined as (List Price−Discount Amount−Cost)/(Cost). The user can specify that all margins within the group must be a certain amount (e.g., 8%).
- Min/Max constraints on margin. The user can specify that all the margins within the group lie between specified min and max values. The user may specify a min or a max or both.

By default, the system may set equality constraints on incentive levels within the group. Financial constraints (min/max incentive budget) apply at the global level. This constraint will apply only to those product/sales channel combinations that are a part of the promotion. Incentive budget is the sum of cost of discount times volume across all product/channel combinations that are a part of the promotion.

In contrast, volume constraints (min/max volume, inventory) apply at a product level. These constraints apply only to product/sales channel combinations that are a part of the promotion. For example, suppose the user has selected "Blue Shirts/San Francisco," "Blue Shirts/San Jose" and "Blue Shirts/L.A." to be in the promotion, where "Blue Shirts" is a product. Then the user could impose a volume constraint on the sales of Blue Shirts. This would be applied to the sum of volumes, Vol(Blue Shirts/San Francisco)+Vol(Blue Shirts/San Jose)+Vol(Blue Shirts/L.A.).

The system will check that min <=max when constraints are entered, but generally will not use any intelligence to determine if there is a feasible solution. Constraints on margin will be translated by the promotional pricing system 100 into constraints on incentive level. Constraints on volume and incentive budget will generally only be available in absolute (i.e., not incremental) terms. The system will also generate constraints for each choice. These are dependent on the incentive type. For example, a discount expressed as % off would have 0<=Discount <=100.

Optimization subject to inventory constraints is similar to unconstrained optimization but user could add constraints saying that demand generated should not exceed user-specified amounts (e.g., amount of inventory available). Alternatively, the user may optimize subject to business rules. Using incentive groups, the user can ensure that incentives are constant across a product category. Using constraints, the user can operate within a fixed marketing budget, and/or ensure that incentives do not vary too greatly from what is currently in place.

In step 1140, the OM 1100 determines the optimal offer. Specifically, the OM 1100 aims to solve (or approximately solve) the problem of considering all the offers that are instances of this offer template. The OM 1100 further considers the subset of these that satisfy the constraints. Each such offer will have an associated profit, and the OM 1100 finds the one that gives the largest profit and uses this as the optimal offer.

The OM 1100 generally produces exact values; for example, it may return that an optimal discount is 28.47% off. The user can always use the optimized program as a guide and round values. Optionally, the OM 1100 may restrict optimization to consider only rounded promotions. In the instant example, the OM 1100 may compare the profitability of a 28% discount with profits from 29% discounts.

Marketing Channel Performance Module 1200

Figure 12:
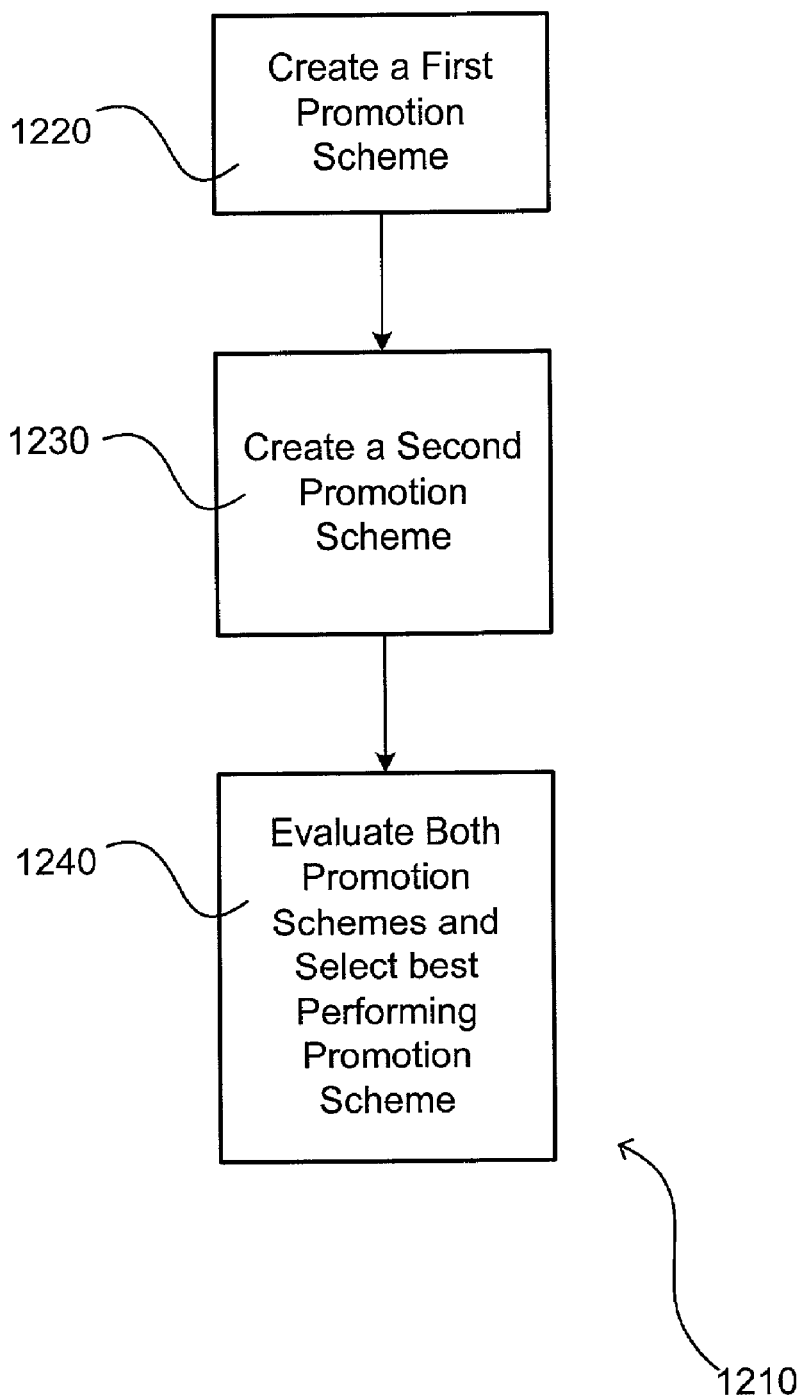

Another embodiment of the promotion system 100 includes the MCPM 1200 to maximize market investment return. As illustrated in FIG. 12, the strategy testing method 1210 comprises the creation of an offer for the customer segment and products of interest, step 1220. The next step 1230 is to try different direct channel and inventive offer combinations. The MCPM 1200 then chooses the promotion offer that gives the best results, 1240.

The user's inputs into the MCPM 1200 includes target products; target customer segment; target incentive type, e.g., cash rebate; marketing communication budget; direct mail unit costs; direct telemarketing unit costs; etc.

The promotion system 100 then determines the number of consumers reached if certain direct channel is chosen as well as which direct marketing channel to choose in order to achieve high margin and what incentive offer gives higher margins. The promotion system 100 further determines expected propensity of a promotion offer, expected number of sales of a promotion offer, expected incremental costs of a promotion offer, and expected incremental profits of a promotion offer.

Overall, a marketing manager has a given number of consumers to reach in the target segment, and is trying to create a direct campaign to promote certain products and achieve high margin at the same time.

Alert Module 1300

Figure 13:
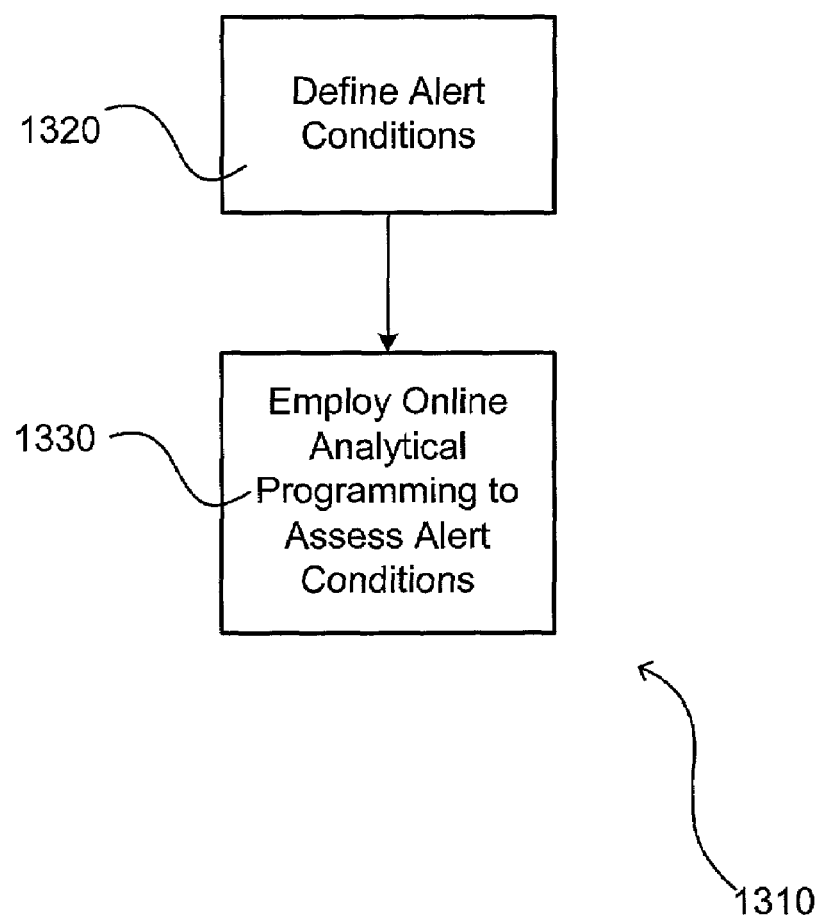

The AM 1300 produces alerts bringing to the user's attention any unexpected data trend. This feature refers to a list view of data behavior that violates some administrator defined business rules in terms of performance indicators. The alert method 1310 is depicted in FIG. 13. Specifically, pre-defined logical expressions with threshold parameters need to be specified and updated by user step 1320. Baseline value refers to the value against which actual current value is compared. It varies depending on the alert type and is defined during step 1320.

Various levels of alert severity may be defined in step 1320. The severity relates the degree of deviation from a baseline value to an actual value. The user needs to specify thresholds against which comparison is made, based on business domain knowledge and practice, and then input them into the appropriate data table. For instance, a severe alert for the actual vs. forecast could be generated if actual sales fall 2000 units or more short of forecast; similarly, a medium alert for the same type would be generated if actual sales fall 1000 to 2000 units short of forecast; and so on. In this example, thresholds for a severe alert is 2000 or more, and between 1000 and 2000 for medium alerts. The alert may further have a direction either below or above, which indicates if actual values are below or above baseline values.

The time period transaction data is aggregated to generate business metrics. It is also the time unit each forecast value is based upon. For actual vs. forecast alerts, it is time unit which forecast is made upon depending on the time unit for the calibration process. The AM 1300 defines this time unit as the basic time unit. For other types of alert, it could be anything beyond the basic time unit, and it is highly desirable to have other time units. For instance, if the basic time unit is made at a weekly level, the time unit could be week, month, quarter, and year, etc. for alerts of current period vs. previous period.

The AM 1300 may employ dynamic on-line analytical processing capability to perform any one of the following actions several times over or in succession, in order to gain a better understanding of a business situation, step 1330:

(1) Comparison of two elements within a Dimension against a single metric or a set of metrics. E.g., compare Product A's performance vs. Product B's performance.
(2) Slice and dice a report across predefined Dimension (min-ship)
(3) Pivot Dimensions
(4) Include metrics from the set of predefined metrics
(5) Drill up or drill down on Dimension hierarchies
(6) Define new metrics and draw these into the analysis Basic alert types include actual vs. forecast, current time period vs. previous period, same variation trend, and year over year comparison. The actual vs. forecast alert is generated by comparison of actual values in the current time period to the forecast value. The baseline value is forecast value for current time period. For instance, if the actual sales of button down shirt for last week were 1000 units less than the forecast, this type of alert would be stimulated. An actual vs. forecast alert may be promotion focused, i.e., only promotion-associated sales can be involved in such an alert, because the forecast in current release is at promotion level. Alternatively, a general forecast or planning enables a more general actual vs. forecast alert. The current time period vs. previous period alert is generated when actual values for the current time period are deviated from the previous time period at certain degree. The baseline value may be the actual values for the previous time period. For instance, if the actual sales of button-down shirts for February were 1000 units less than those of January, such type of alert would be stimulated.

A variation trend may be generated when actual values in n consecutive time periods decrease or increase, showing a consistent trend in these time periods. In this case, the baseline value could be a correlation coefficient for the time serial of actual values and time periods. For instance, if the monthly actual sales of button-down shirts from January to June of 2001 were 300, 280, 250, 240, 220, and 190, respectively, showing a declination trend, such type of alert would be stimulated because the correlation coefficient is more than 0.9.

Similarly, a year-over-year alert may be generated when actual values for a time period deviate from the same time period in the previous year to a certain degree. The baseline value refers to the value for the same time period in the last year. For instance, if December sales of button-down shirts in year 2000 were 3000 units less than those in year 1999, such type of alert would be stimulated.

Figure 1B:
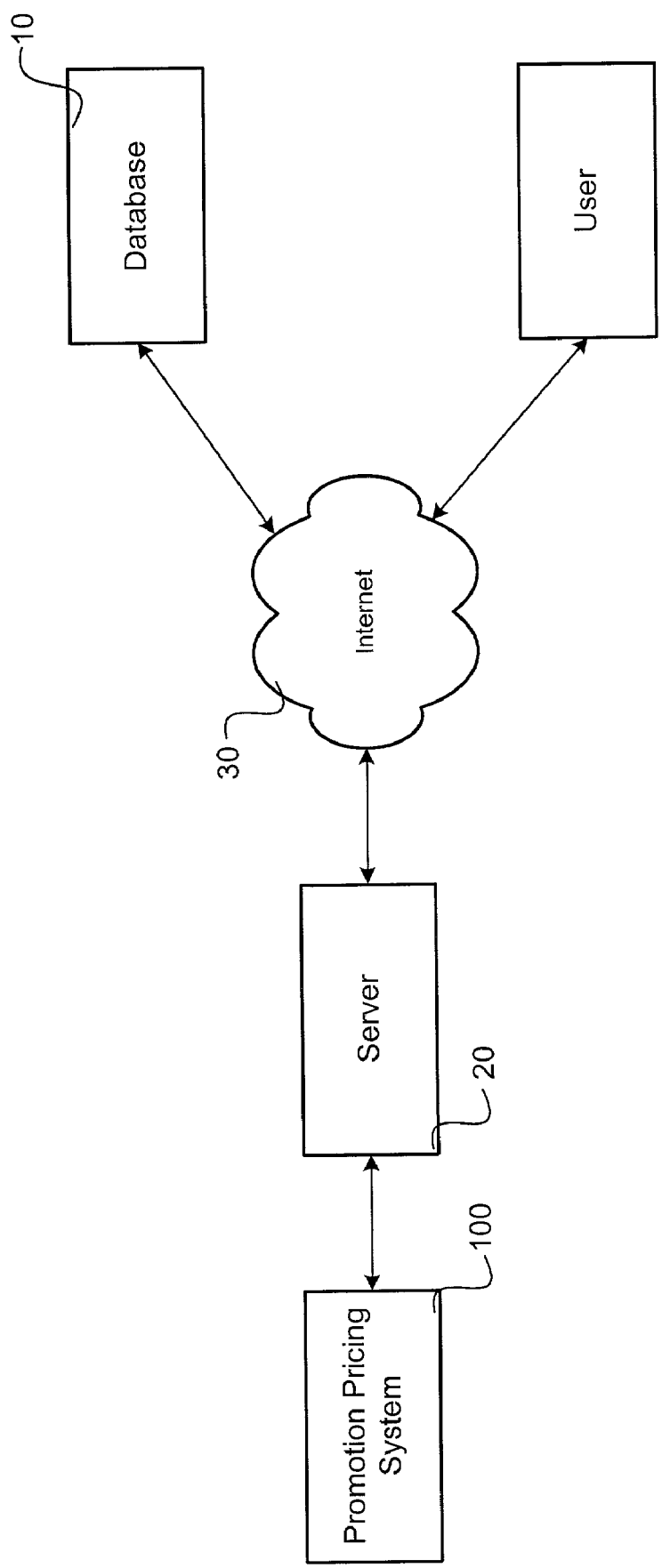

In one embodiment depicted in FIG. 1B, the promotion system 100 is configured to operate over a distributed network such as the Internet. Specifically, the various modules of the promotion system 100 operate as JAVA or C applications that may be served or are executed at the server. In particular, the user may be in communication with the system 100 via electronic networks such as the Internet, an intranet, an extranet, a Value Added Network ("VAN"), VPN and the like. The Internet browser may be, for example, Netscape Navigator or Microsoft Internet Explorer. Those skilled in the art will recognize that this invention may be physically implemented in a number of ways.

Figure 1C:
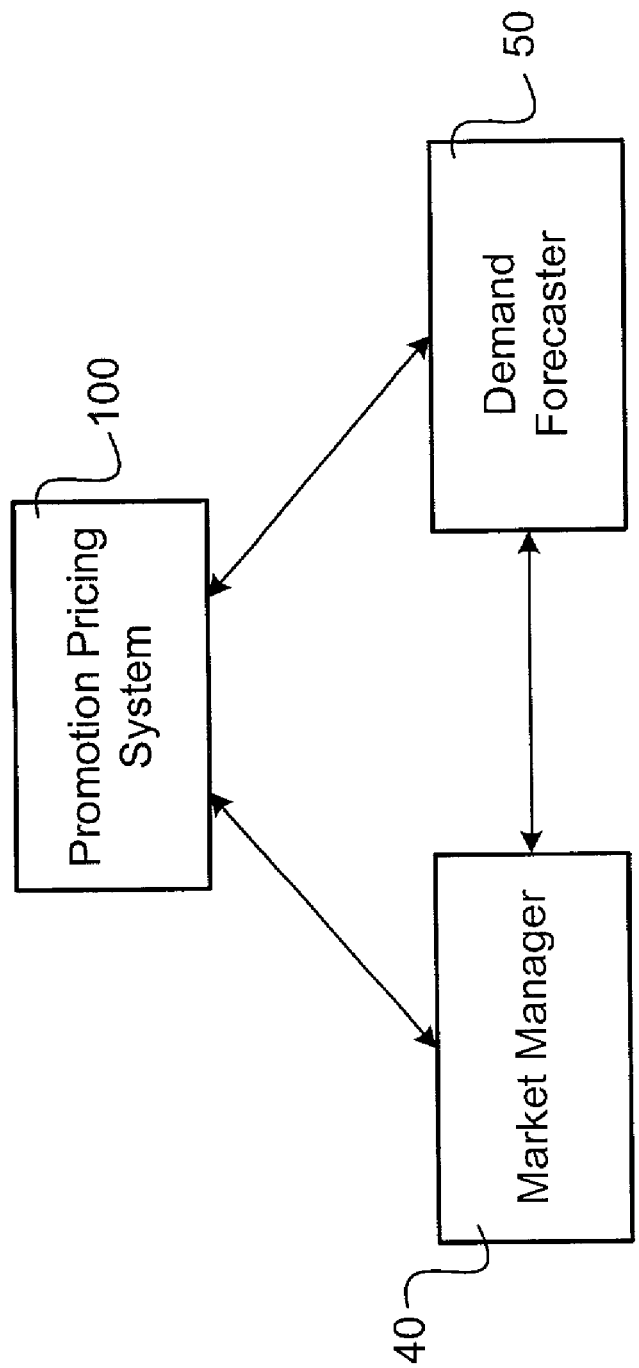

In another embodiment illustrated in FIG. 1C, the promotion system 100 is connected to a market management application 40 and a demand forecaster 50. The interaction of the promotional pricing system 100 with these components is described above in the text accompanying FIG. 8.

EXAMPLE

The operation of the promotion system 100 and the use of drivers are now explained through the following example that describes the creation of a promotion pricing model for a manufacturer. In the following example, it is supposed that three types of incentives are offered by the Manufacturer for its truck—a cash rebate, low finance and a lease rate. Logically, the truck finance and the truck lease drivers are the price paid by the customer per month, so by construction they will never be null. If the Manufacturer decides not to give any cash rebate for its Truck (no incentives for cash back), the driver price still won't be null for mathematical purposes because at some point in the process of calculating the utility of Truck, the log of the drivers will need to be calculated and, therefore, the drivers cannot be null. The promotion system 100 operates to prevent null values for the drivers that may preclude or adversely impact the evaluation of the promotions. The following Table 1 represents the different incentives that may be offered by the Manufacturer as well as the drivers affected by these incentives.

TABLE 1

| Incentive | Driver |
| --- | --- |
| Cash back ($) | Amount of Cash back ($) |
| APR rate (%) | Total Monthly payment ($) |
| Lease | Total Monthly payment ($) |

The promotion system 100 determines, for instance, that the product (or product segments) of interest is Truck ("T") and the primary competitor product segment is an SUV (S). As suggested in the Table 1, the different promotions in this example are a cash discount (C), a finance discount (F) and a lease discount (L). Hypothetically, the customers for the product segments may be segmented into Upscale (U) and downscale (C) categories. The promotion system 100 may further define a trend or time period so as to compare offers across different times and thereby allow normalization for past promotions.

The incentive translator may further designate the independent variables representing the measure the consumers use to evaluate the competing products. For instance, the Manufacturer may use Attractiveness to measured utility in the product segment including the Truck and the SUV. As described above, the independent variable Attractiveness is a function of many factors, including:

(1) preference variables, namely the product and promotion type;
(2) the manufacturer's own influence as measured by the driver of the target incentive (product$_i$*deal type$_j$)
(3) cross-impact influences, including cross-product and cross-deal factors; and
(4) month trends, where preference variables are the constant component of the model, and the influence of the manufacturer's other products, cross-impact influences from competitive products, and trend factors impact the independent variable through their coefficients. Other factors that may be considered in determining the Attractiveness of products are:

(5) preference variables in the channel
(6) the manufacturer's own influence in the channel
(7) cross-impact influences such as cross channel, pull-forward factors
(8) seasonality trends
(9) a competitive factor Thus, the example has defined products, channels, incentives, customer segments, and many other variables. Two concepts are now introduced: choice and choice situation. A choice is a combination of product i, incentive type j, and channel k. A choice is what a customer can choose. A choice context is the environment where customers are making decisions, or things customers cannot change. A choice context is a combination of Market Group, Subsegment, Segmentation, Customer segment. Here is a more detailed example of the above method, dropping the Adjustment factor for now to simplify the problem:

$$Volume_{T,C,Promo,Young} = Volume_{A,B,Base,Young} \times \frac{S_{T,C,Promo,Young}}{S_{A,B,Base,Young}} \quad (11)$$

Where
Target choice: Truck cash (T,C);
Target Program: Promo;
Target Customer Segment: Young;
Baseline program: Base;
Baseline Choice: (Vehicle A, Incentive B);
A: can be any vehicle in the target subsegment;
B: can be any incentive type in the choice set;
$Volume_{A,B,Base, Young}$: user's volume estimate of the baseline choice for the target customer segment;
$S_{T,C,Promo, Young}$: the forecast market share of the target choice for the target customer segment; and
$S_{A,B,Base, Young}$: the forecast market share of the baseline choice for the target customer segment;

This equation 11 implies the following relation:

$$\sum_{promo} Volume = \frac{Volume_{T,C,Promo,Young}}{S_{T,C,Promo,Young}} = \frac{Volume_{A,B,Base,Young}}{S_{A,B,Base,Young}} = \sum_{Base} Volume \quad (12)$$

The sum of volumes for all choices in the promo program equals the sum of volumes for all choices in the baseline program, given the choice context. Another issue arises when user estimates $Volume_{A,B,Base\ Young}$. Practically, users may not have a good idea about this variable because this ($Volume_{A,B,Base,\ Young}$) may not be meaningful enough to them.

To fix this, the promotion system 100 can use something more meaningful for the Baseline choice, and then the users will be asked to provide volume estimates for the Baseline choice, which now makes more sense to them. In the following example, the promotion system 100 asks users to estimate $Volume_{Sedan,Base,\ Young}$, instead of $Volume_{sedan,Cash,Base,\ Young}$ or $Volume_{sedan,Fin,Base,\ Young}$.

Assuming the following conditions:
There are only two deal types available: (Finance, Cash);
Sedan is also a vehicle in the subsegment;
Target customer segment: Young;
Target choice: (Truck, Cash) or (T, C); and
Baseline Choice: (Sedan).

then, $Volume_{Truck,Cash,Promo,\ Young}$ can be obtained from the following equation:

$$Volume_{T,C,Promo,Young} = Volume_{Sedan,Base,Young} \times \frac{S_{T,C,Promo,Young}}{S_{Sedan,Base,Young}} \quad (13)$$

where $Volume_{Sedan,Base\ Young}$ and $S_{Truck,Cash,Promo,\ Young}$ are provided by user promotion system 100. Also, $$S_{sedan,Base\ Young} = S_{sedan,Cash,Base,Young} + S_{sedan,Fin,Base,\ Young}, \quad (14)$$

which are still provided by the promotion pricing system, as described above.

$$Volume_{Sedan,Base\ Young} \times \frac{S_{T,C,Promo,Young}}{S_{Sable,Cash,Base,Young} + S_{Sable,Fin,Base,Young}} = \quad (15)$$

$$\frac{Vol_{Sedan,Cash,Base,Young} + Vol_{Sedan,Fin,Base,Young}}{S_{Sedan,Cash,Base,Young} + S_{Sedan,Fin,Base,Young}} \times S_{T,C,Promo,Young} =$$

$$\frac{\sum_{Base} Vol + S_{Sedan,Cash,Base,Young} + \sum_{Base} Vol + S_{Sedan,Fin,Base,Young}}{S_{Sedan,Cash,Base,Young} + S_{Sedan,Fin,Base,Young}} \times$$

$$S_{T,C,Promo,Young} =$$

$$\sum_{Base} Vol \times S_{T,C,Promo,Young} = Volume_{T,C,Base,Young}$$

If providing $Volume_{Sedan,Base,Young}$ is still difficult to users, users can estimate $Volume_{Sedan,Base}$. The Promotion Pricing system 100 may calculate the conditional probabilities from the database, $Prob(Vol_{Sedan,young}|Vol_{Sedan,old+young})$, and then compute $Volume_{Sedan,Base,Young}$.

$$Volume_{Sedan,Base,Young} = Volume_{Sedan,Base} \times Prob(Vol_{Sedan,young}|Vol_{Sedan,\ Young+Old}) \quad (16).$$

The example has discussed products, channels, incentives, customer segments, and many other variables. Two concepts new are now introduced in the example: choice and choice situation. A choice is a combination of product i, incentive type j, channel k and represents what a customer can choose. Similarly, a choice context is the environment where customers are making decisions, or things customers cannot change. In this example, a choice context may be a combination of Market Group, Subsegment, Segmentation, Customer segment.

In this example, users may associate different segmentations with different products. Let's assume that there are two products (Sedan, Truck). The segmentation for Sedan is (Old, Young), and the segmentation for Truck is (Rich, Poor). In this example, the Manufacturer has an incentive for (Sedan, Old), but there will be no incentive for (Sedan, Poor) because (Rich, Poor) is not how Sedan segmented its customers.

$$\begin{bmatrix} Sedan_{old} \\ Sedan_{young} \\ Truck_{rich} \\ Truck_{poor} \end{bmatrix} = \begin{bmatrix} X^{SO} & 0 & 0 & 0 \\ 0 & X^{SY} & 0 & 0 \\ 0 & 0 & X^{TR} & 0 \\ 0 & 0 & 0 & X^{TP} \end{bmatrix} \begin{bmatrix} B^{SO} \\ B^{SY} \\ B^{TR} \\ B^{TP} \end{bmatrix} \quad (17A)$$

or $$Y = XB \quad (17B)$$

where
 Y: ln(market share of vehicle i and segment j); and
 $X^{ij}$: the drivers, including its own driver and cross-impact drivers, for vehicle i, segment j; and
 $B^{ij}$: the parameters of the corresponding vehicle and segment are $X^{ij}$, $B^{ij}$ matrices; and
 Superscript: S=Sedan, T=Truck; O=Old, Y=Young, R=Rich, P=Poor.

Accordingly, $$X^{SO} = [X_{SO}^{SO}\ X_{SY}^{SO}\ X_{TO}^{SO}\ X_{TY}^{SO}]\ B^{SO} = [\beta_{SO}^{SO}\ \beta_{SY}^{SO}\ \beta_{TO}^{SO}\ \beta_{TY}^{SO}],$$

$$X^{SY} = [X_{SO}^{SY}\ X_{SY}^{SY}\ X_{TO}^{SY}\ X_{TY}^{SY}]\ B^{SY} = [\beta_{SO}^{SY}\ \beta_{SY}^{SY}\ \beta_{TO}^{SY}\ \beta_{TY}^{SY}],$$

$$X^{TR} = [X_{SR}^{TR}\ X_{SP}^{TR}\ X_{TR}^{TR}\ X_{TP}^{TR}]\ B^{TR} = [\beta_{SR}^{TR}\ \beta_{SP}^{TR}\ \beta_{TR}^{TR}\ \beta_{TP}^{TR}],$$

$$X^{TP} = [X_{SR}^{TP}\ X_{SP}^{TP}\ X_{TR}^{TP}\ X_{TP}^{TP}]\ B^{TP} = [\beta_{SR}^{TP}\ \beta_{SP}^{TP}\ \beta_{TR}^{TP}\ \beta_{TP}^{TP}],$$

Since the segmentation associated with Sedan is not (Rich, Poor), the incentive driver for (Sedan, Rich), or (Sedan, Poor) will need to be deduced using conditional probabilities.

To calculating the cross-impact drivers under segmentation, the promotion system 100 may calculate the cross-impact driver from Truck onto a customer segment J of Sedan. Suppose Truck has 3 customer segments 1, 2, 3. Each customer segment of Truck has its own cash incentive (CGAR), finance program incentive (FGAMP) and monthly lease payment (LMP). Call these CGAR(1), FGAMP(1), LMP(1), etc. The cross-impact drivers onto Sedan are then:

$$CGAR = P(1|J)*CGAR(1) + P(2|J)*CGAR(2) + P(3|J)*CGAR(3) \quad (18)$$

$$FGAMP = P(1|J)*FGAMP(1) + P(2|J)*FGAMP(2) + P(3|J)*FGAMP(3) \quad (19)$$

$$LMP = P(1|J)*LMP(1) + P(2|J)*LMP(2) + P(3|J)*LMP(3) \quad (20)$$

thereby using the weighted averages of the drivers, with the weights being the conditional probabilities of the customer segments.

Similar formulas apply for different numbers of customer segments, i.e., if the customer segments of the impacting vehicle are in a set CS, then $$CGAR = \sum_{i \in CS} P(i|J) * CGAR(i) \quad (21)$$

$$FGAMP = \sum_{i \in CS} P(i|J) * FGAMP(i) \quad (22)$$

$$LMP = \sum_{i \in CS} P(i|J) * LMP(i) \quad (23)$$

Alternatively, once a segmentation has been specified for a product, the promotion system 100 may assume that all other products will be associated with this segmentation as well. For example, there are still two products (Sedan, Truck), and the segmentation for Sedan is specified to be (Old, Young). The regression now looks like this:

$$\begin{bmatrix} Sedan_{old} \\ Sedan_{young} \\ Truck_{old} \\ Truck_{young} \end{bmatrix} = \begin{bmatrix} X^{SO} & 0 & 0 & 0 \\ 0 & X^{SY} & 0 & 0 \\ 0 & 0 & X^{TO} & 0 \\ 0 & 0 & 0 & X^{TY} \end{bmatrix} \begin{bmatrix} B^{SO} \\ B^{SY} \\ B^{TO} \\ B^{TY} \end{bmatrix} \quad (24)$$

By imposing the segmentation assumption, the number of calibration models becomes manageable. This gives the promotion pricing system 100 the capability to compute parameters for all possible segmentations in advance. With the attraction model, equation 24 may be seen as:

$$Y = X * \beta \quad (25)$$

where
 Y=Utility, and
 X=own drivers and cross-impact drivers.

Also, $$S_i = \frac{S_i}{\sum_j S_j} \quad (26)$$

Where, $S_i$=the normalized market share of vehicle i, and $$\sum_j S_j :$$

the sum of market shares of vehicles in the same subsegment.

With the multiplicative model, equation 24 is also written as:

$$Y = X * \beta \quad (25)$$

For instance, if the products in the multiplicative model Truck(T) and SUV(S) and the promotion types are Cash(C) and Finance(F), then $$Q_{TC} = \alpha_{TC} + \beta_{TC}^{TC} X_{TC} + \beta_{TF}^{TC} X_{TF} + \beta_{AC}^{TC} X_{AC} + \beta_{AF}^{TC} X_{AF} \quad (27)$$

$$Q_{TF} = \alpha_{TF} + \beta_{TF}^{TF} X_{TF} + \beta_{TC}^{TF} X_{TC} + \beta_{AC}^{TF} X_{AC} + \beta_{AF}^{TF} X_{AF} \quad (28)$$

$$Q_{AC} = \alpha_{AC} + \beta_{AC}^{AC} X_{AC} + \beta_{AF}^{AC} X_{AF} + \beta_{TC}^{AC} X_{TC} + \beta_{TF}^{AC} X_{TF} \quad (29)$$

$$Q_{AF} = \alpha_{AF} + \beta_{AF}^{AF} X_{AF} + \beta_{AC}^{AF} X_{AC} + \beta_{TC}^{AF} X_{TC} + \beta_{TF}^{AF} X_{TF} \quad (30)$$

where the constraints are the directions of Betas and other client-specific constraints.

Suppose in a homogenous market, two products (L=1,2) are competing with each other in 12 (T=12) month periods, both products have two incentive offers (K=1,2). So there are K*L pairs (l=1/k=1, 1=1/k=2, 1=2/k=1, 1=2/k=2) of unique product offers (I=1,2,3,4) for each period. The following equations describe different approaches to estimate promotion responses. With the multiplicative model, $$S_i = \exp(\alpha_i) * \prod_{j=1}^{4} X_j^{\beta_{ij}} * \varepsilon_i \quad (31)$$

$$Ln(\hat{S}i, t) = \alpha_i + \sum_{j=1}^{4} \prod_{j=1}^{4} \beta_{ij} Ln(X_{j,t}) \quad (32)$$

where the number of parameters estimated (columns in X matrix) is I*(1+I)=20, the number of observations (rows) equals I*T=48, the elasticity is $e_{si} = \beta_{ij}$. In contrast, with the attraction model, $$A_i = \exp(\alpha_i) * \prod_{j=1}^{4} X_j^{\beta_{1j}} * \in_1; \quad (33)$$

$$S_i = \frac{Ai}{\sum_{j=1}^{4} A_j} \; ; \text{ and} \quad (34)$$

$$Ln(\hat{A})_{i,t} = \alpha_i + \sum_{u=1}^{T} \gamma_u D_u + \sum_{j=1}^{4} \beta_{ij} Ln(X_{j,t}) \quad (35)$$

where the number of parameter estimated (columns in X matrix) equals I*(1+I)+T, or 32;

the number of observations (rows) is I*T, which is 48 in this example; and elasticity is found by $e_{si} = \beta_{ij}(1-s_i)$.

In both models, the dummy variable $D_u=1$ if u=t and $D_u=0$ if u≠t If the algorithm does not allow estimating without intercept term, $$\alpha_i = \sum_{j=1}^{4} \alpha_j d_j,$$

where $d_j=1$ if j=i and $d_j=0$ if j i.

Constraints can then be:

$\beta_{ij} > 0$ if i=j
$\beta_{ij} < 0$ if i in (1,2) and j in (3,4) or vice versa
$\beta_{12} = \beta_{34}$
$\beta_{21} = \beta_{43}$
$\beta_{13} = \beta_{24}$
$\beta_{31} = \beta_{42}$ The promotion system 100's goal is to get an idea of how many β parameters the calibration will need to determine.

The calibration process will need to solve the following equation for each customer segment and each subsegment of the products.

$$\begin{bmatrix} Y_{prod1,channel1,deal-type1} \\ \vdots \\ Y_{proda,channelc,deal-typed} \end{bmatrix} = \quad (36)$$

$$\begin{bmatrix} X_{prod1,channel1,deal-type1} & 0 \\ 0 & 0 \\ 0 & 0 \\ 0 & Y_{prodn,channelc,deal-typed} \end{bmatrix}$$

$$\begin{bmatrix} \beta_{prod1,channel1,deal-type1} \\ \vdots \\ \beta_{prodn,channelc,deal-typed} \end{bmatrix}$$

where

Y is the vector (n,1) of the utility of a product for a certain segment, channel, deal-type over the last n periods of time;

X is the matrix (n, m) of the drivers of a product for a certain segment, channel, deal-type over the last m periods of time; and β is the vector (m,1) of the β for a certain product, segment, channel and deal-type over the last m periods of time.

In this example, the promotion pricing system may estimate the variable m first, i.e., estimate for a product, deal-type, subsegment, customer segment, and channel, how many P needs to be calculated. The following table fixes the value of each constant:

TABLE 2

| Parameter | Number |
|---|---|
| Product | N |
| Deal type | Δ |
| Segment | E |
| Sub-segment | S |
| Channels | C |
| X-product | K |
| Period | P |

By listing the drivers used to calculate the attraction of a certain product, deal-type, segment and channel, the promotion system 100 may estimate each time the number of β, assuming global segmentation and no X-impact between trade-up/trade-down in different deal types or different channels, and no constraint across subsegments.

TABLE 3

| Effect | Number of B to calculate |
|---|---|
| Own driver (Cross deal-types, Cross channel) | δC |
| Cross-products (including trade-up and trade-down, the cross-deal-type of each channel of each cross-product) | δCK |

TABLE 3-continued

| Effect | Number of B to calculate |
|---|---|
| Trend | 1 |
| Constant | 1 |
| Cross periods (constant for each customer segment) | P − 1 |
| Total | δC(K + 1) + P − 1 |

Thus, for every product, deal-type, segment and channel, the total number of βs to be estimated by the calibration will then be:

Total number of $\beta s = \sigma S*[N\delta C*(\delta CK+\delta C+2)+P-1]$.

Example, with the model set up in Table 4,

TABLE 4

| Parameter | Number |
|---|---|
| Product | 20 |
| Deal type | 3 |
| Segment | 4 |
| Sub-segment | 2 |
| Channels | 3 |
| X-products | 3 |
| Periods | 24 |

Then, the total number of $\beta = 4*2*[20*3*3*(3*3*3+3*3+2)+24-1]=54,904$

In the attraction model, the number of α's equals the number of MarketGroups * the number of product Subsegments * the number of Customer Segments * [the number of Choices * (the number of Choices+2)+the number of Periods−1]. Likewise, the number of Observations equals the number of MarketGroups * the number of product subsegments * the number of Customer segments * the number of Choices * the number of Periods. If there were no constraint, it has to meet the condition that the number of Observations is equal or greater than the number of βs to be able to estimate all βs. So, $$\text{the number of Periods} > \text{the number of Choices} + 3 + \frac{1}{2}(\text{the number of Choices} - 1) \quad (37)$$

In the multiplicative model, the number of β's equals the number of MarketGroups * the number of product Subsegments * the number Customer Segments * the number of Choices * (the number of Choices+2). As before, the number of Observations equals the number of MarketGroups * the number of product subsegments * the number of Customer segments * the number of Choices * the number of Periods. If there are no other constraints, the model still has to meet the condition that (X) the number of Observations is equal or greater than the number of β's to be able to estimate all βs. Therefore, the number of Periods must be greater than the number of Choices +2.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed to incorporate new communication networks and protocols as they are developed. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A method for evaluating a promotion scheme for a product, the method comprising the steps of:

providing a computer to a user;

said computer collecting market data related to said product to create a model of a market for the product, wherein said market model identifies at least one competing good, and wherein said computer defines customer segments for said product and said competing goods in said market model, and wherein said customer segments are statistically independent such that a sale to one of the customer segments does not effect a demand from others of the customer segments, said computer collecting historical transaction data related to transactions of the product and the competing goods in the consumer segments during at least a first and a second time period;

said computer analyzing the historical data and dynamically selecting a statistical model to evaluate said promotion scheme, wherein said computer selects a multiplicative model when the computer determines during the analyzing of the historical data that:

(a) the historical transaction data satisfies a predefined completeness criterion, (b) sales of the product and sales of the competing goods are statistically dependent, (c) sales of the product and the competing goods during the first time period are statistically dependent on sales of the product and the competing goods during the second time period, or (d) a number of the product and the competing goods exceeds a predefined number criterion, and wherein said computer otherwise selects an attractive model and said computer using said statistical model to analyze the historical data and the market model to determine a utility of the product without the promotion scheme; and said computer using said statistical model to estimate a change in utility of the product from the promotion scheme.

2. The method of claim 1, further comprising the steps of:

said computer identifying a driving factor in sales of the product;

said computer determining a future change to the driving factor caused by the promotion scheme;

during the analyzing step, said computer correlating the sales trends of the product and historical changes in the driving factor; and said computer estimating a future change in sales of the product by associating the future change to the driving factor with similar historical changes in the driving factor.

3. The method of claim 2, wherein the driving factor is a relative price for the product.

4. The method of claim 2, wherein the driving factor is attractiveness of the product.

5. The method of claim 1 further comprising the steps of:
said computer accepting data from the user for defining a business goal; and
said computer using the estimated change in utility of the product to estimate the ability of the promotion scheme to meet the business goal.

6. The method of claim 5, wherein the business goal is the elimination of a current inventory of the product.

7. The method of claim 1, further comprising the steps of:
said computer updating the historical data to include data from new sales; and
said computer adjusting the estimated change in utility of the product in view of the new sales data.

8. The method of claim 1 wherein the promotion scheme is a first promotional scheme, and further comprising the steps of:
said computer forming a second promotion scheme;
said computer estimating the change in utility of the product from the second promotion scheme;
and said computer comparing the changes in the utility of the product caused by the first and second promotion schemes.

9. The method of the claim 1 further comprising the steps of
said computer forecasting future demand for the product without the promotion scheme; and
said computer using the forecasted future demand in estimating the change in utility of the product from the promotion scheme.

10. A computer-executable program storage medium tangibly embodying a program of instructions to perform a method for evaluating a promotion scheme for a product, the method comprising the steps of:
collecting market data related to said product to create a model of a market for the product, wherein said market model identifies at least one competing good, and wherein said market model defines customer segments for said product and said competing goods in said market model, and wherein said customer segments are statistically independent such that a sale to a first customer segment does not effect a demand from a second customer segment,
collecting historical transaction data related to transactions of the product and the competing goods in the customer segments during at least a first and a second time period;
analyzing the historical data and dynamically selecting a statistical model to evaluate said promotion scheme, wherein a multiplicative model is selected when the analysis determines that:
(a) the historical transaction data satisfies a predefined completeness criterion,
(b) sales of the product and sales of the competing goods are statistically dependent,
(c) sales of the product and the competing goods in the first and the second time periods are statistically dependent, or
(d) a number of the product and the competing goods exceeds a predefined number criterion, and
wherein otherwise an attractive model is selected; and
using said statistical model to analyze the historical data and the market model to determine a utility of the product without the promotion scheme; and
using said statistical model to estimate a change in utility of the product from the promotion scheme.

11. The computer-executable program storage medium of claim 10, wherein the method further comprises the steps of:
identifying a driving factor in sales of the product;
determining a future change to the driving factor caused by the promotion scheme;
during the analyzing step, correlating the sales trends of the product and historical changes in the driving factor; and
estimating a future change in sales of the product by associating the future change to the driving factor with similar historical changes in the driving factor.

12. The computer-executable program storage medium of claim 11, wherein the driving factor is a relative price for the product.

13. The computer-executable program storage medium of claim 11, wherein the driving factor is attractiveness of the product.

14. The computer-executable program storage medium of claim 10, wherein the method further comprises the steps of:
accepting data from the user for defining a business goal; and
using the estimated change in utility of the product to estimate the ability of the promotion scheme to meet the business goal.

15. The computer-executable program storage medium of claim 14, wherein the business goal is the elimination of a current inventory of the product.

16. The computer-executable program storage medium of claim 10, wherein the method further comprises the steps of:
updating the historical transaction data to include data from new sales; and
adjusting the estimated change in utility of the product in view of the new sales data.

17. The computer-executable program storage medium of claim 10, wherein the promotion scheme is a first promotional scheme and wherein the method further comprises the steps of:
forming a second promotion scheme;
estimating the change in utility of the product from the second promotion scheme;
and comparing the changes in the utility of the product caused by the first and second promotion schemes.

18. The computer-executable program storage medium of claim 10, wherein the method further comprises the steps of:
forecasting future demand for the product without the promotion scheme; and
using the forecasted future demand in estimating the change in utility of the product from the promotion scheme.

* * * * *